United States Patent
Lorenz et al.

(10) Patent No.: US 8,392,842 B1
(45) Date of Patent: Mar. 5, 2013

(54) QUICK SEARCH FOR REPLACEMENT OF PORTION OF IMAGE

(75) Inventors: Jon Lorenz, San Francisco, CA (US); Thomas Hobbs, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 519 days.

(21) Appl. No.: 12/142,255

(22) Filed: Jun. 19, 2008

(51) Int. Cl.
*G06F 3/048* (2006.01)

(52) U.S. Cl. .................. 715/767; 382/103; 382/190

(58) Field of Classification Search .............. 715/767, 715/798, 707
See application file for complete search history.

(56) References Cited

U.S. PATENT DOCUMENTS

| | | | | |
|---|---|---|---|---|
| 7,374,077 | B2 * | 5/2008 | Shimura | 235/375 |
| 7,764,849 | B2 * | 7/2010 | Aguera y Arcas et al. | 382/305 |
| 2004/0003001 | A1 * | 1/2004 | Shimura | 707/104.1 |
| 2006/0072830 | A1 * | 4/2006 | Nagarajan et al. | 382/224 |
| 2007/0016492 | A1 * | 1/2007 | Linker et al. | 705/26 |
| 2007/0143272 | A1 * | 6/2007 | Kobayashi | 707/3 |
| 2007/0291323 | A1 * | 12/2007 | Roncal | 358/402 |
| 2008/0225316 | A1 * | 9/2008 | Yamamoto | 358/1.9 |
| 2008/0226119 | A1 * | 9/2008 | Candelore et al. | 382/100 |
| 2009/0200366 | A1 * | 8/2009 | Kasahara | 235/375 |

OTHER PUBLICATIONS

Rustybucket999, photoshop car mod tutorial wheels colour change lower (Feb. 8, 2007). http://www.youtube.com/watch?v=b8FAkr8H-dc.*

* cited by examiner

*Primary Examiner* — Andrey Belousov
*Assistant Examiner* — Di Xiao
(74) *Attorney, Agent, or Firm* — Schwegman Lundberg Woessner P.A.

(57) ABSTRACT

In one example embodiment a system and method is illustrated to receive image data identifying a characteristic of a portion of a first image, the first image displayed as part of a Graphical User Interface (GUI). The system and method may also include generating a search request for a second image based upon the characteristic. Further, the system and method may include receiving an image search result including at least the second image, the second image displayed as part of an image array within the GUI. Moreover, the system and method may include augmenting the first image with the second image, based upon the characteristic, to create an augmented image.

23 Claims, 20 Drawing Sheets

US 8,392,842 B1

QUICK SEARCH FOR REPLACEMENT OF PORTION OF IMAGE

COPYRIGHT

A portion of the disclosure of this document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots that may be illustrated below and in the drawings that form a part of this document: Copyright© 2008, Adobe Systems Incorporated. All Rights Reserved.

TECHNICAL FIELD

The present application relates generally to the technical field of algorithms and programming and, in one specific example, the manipulation of images.

BACKGROUND

Images may be easily manipulated using anyone of a number of image editing software applications. These image editing applications may allow for a user to resize an image, change the color in an image, or perform any one of a number of operations on an image. These image editing applications may be stand alone applications that do not require network connectivity to operate.

BRIEF DESCRIPTION OF THE DRAWINGS

Some embodiments are illustrated by way of example and not limitation in the figures of the accompanying drawings in which.

DETAILED DESCRIPTION

Figure 1:
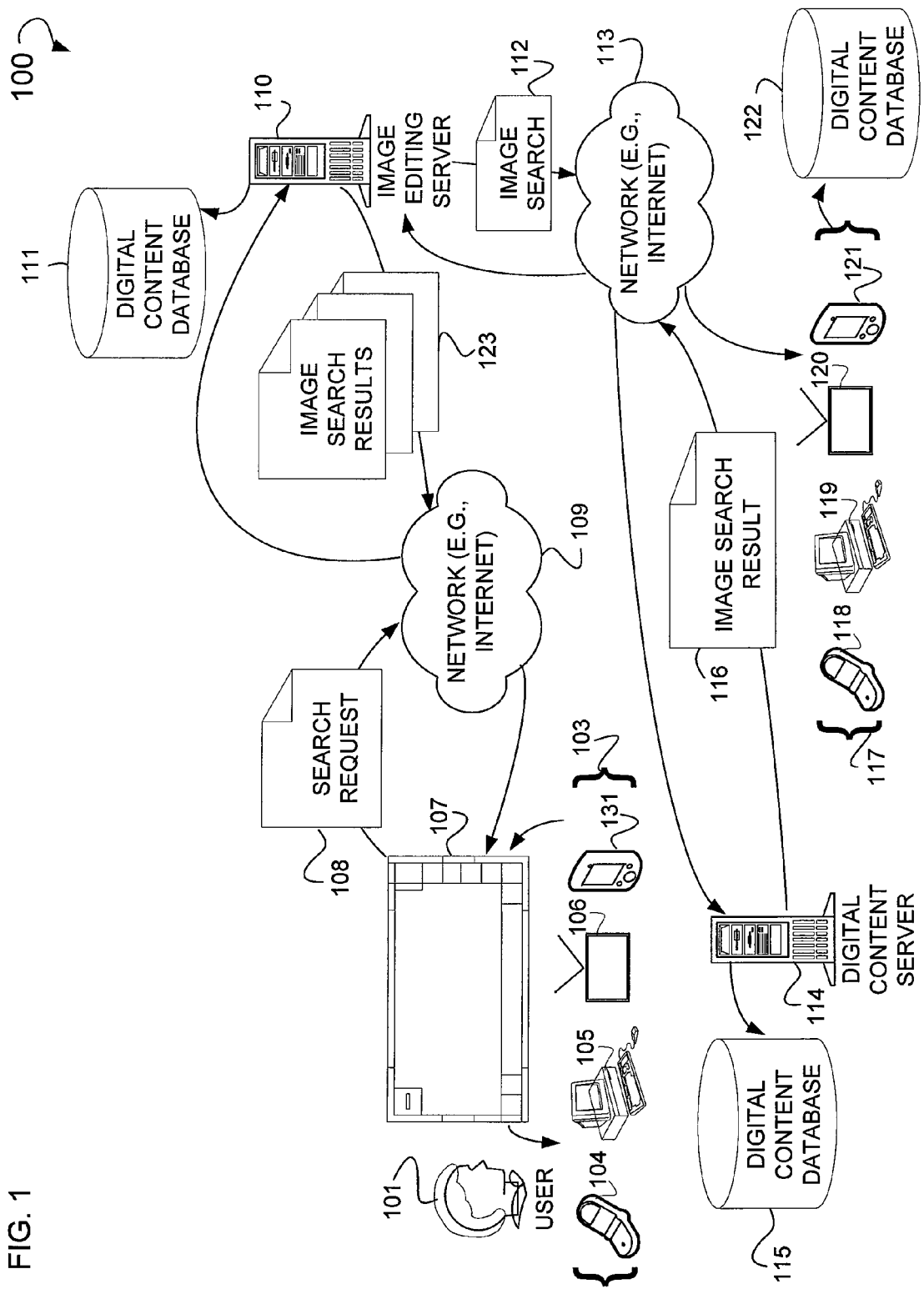
FIG. 1 is a diagram of a system, according to an example embodiment, used to generate image search results based upon a search request.

In the following description, for purposes of explanation, numerous specific details are set forth in order to provide a thorough understanding of an example embodiment of the present invention. It may be evident, however, to one skilled in the art that the present invention will be practiced without these specific details.

In some example embodiments, a system and method is illustrated for augmenting an image with an additional image or portion thereof (collectively an image) to create an augmented image. This augmentation may be facilitated through the searching and retrieval of an image that includes characteristics (e.g., data) similar to the characteristics in the image that is being augmented. A characteristic may include color histograms, an image pattern, a bit value and associated codec, or macro-block matching. A color code may be included in the characteristic(s), where a color code is a hexadecimal representation of a color. For example, a first image of a bridge (e.g., a characteristic, or collection of characteristics) may be augmented with a second image of the same bridge, where the second image shows aspects of the bridge that a user would like to include in the first image. The image may be a photo that is a two-dimensional artifact. The first image and second image may be formatted using a Joint Photographic Experts Group Format (JPEG), a Graphics Interchange Format (GIF), a Tagged Image File Format (TIFF), or some other suitable file format. These file formats may be referenced below as codecs.

In some example embodiments, the system and method is shown for augmenting an image with an additional image using pixel values to denote a portion of the image to augment. In one example embodiment, selection input may be received denoting a portion of an image that is to be augmented with an additional image. Augment may mean to increase, to replace, to add, or to create. A search may be conducted using the selection input such that the potion of the image may be searched for in a native database, or within a network environment. Search may be based upon characteristics of an image, or some other suitable basis.

In some example embodiments, the system and method is shown for augmenting an image with an additional image using computers organized in a client-server arrangement. A client computer may have a web browser or other suitable Hyper Text Markup Language (HTML), or eXtensible Markup Language (XML) interpreter, and client engine operatively coupled to the web browser. The client engine may be a FLASH™, Asynchronous JavaScript and XML (AJAX), ACTIVE X™, a SILVERLIGHT™, MOONLIGHT™, or Java client engine. This client engine is referenced herein as a plug-in. One or more devices may act as a client computer. A server computer may be an application server, web server, or some combination of an application server and a web server. An image editing server, or social networking server may be a server computer. An image editing server may be a server that allows for a client computer to augment an image with an additional image. A social networking server may be a server that executes software to build online social networks for communities of people (e.g., natural persons or legal entities such as corporations) who share interests and activities or who are interested in exploring the interests and activities of others.

In some example embodiments, the system and method is shown for augmenting an image with an additional image that may include the image editing server retrieving an image to augment another image. The augmentation itself may be executed by the plug-in. In one example embodiment, the client computer receives the additional image as an image search result that may be manipulated by a user. Further, the client computer receives input to manipulate the image received as part of the search result into a position in a GUI. A result of this manipulation, the image is augmented with the additional image to create an augmented image.

In some example embodiments, the system and method is shown for posting the augmented image (e.g., as a modified image with a search result) on a social networking web page for a particular user. A social network server may provide the functionality to request and augment an image with an additional image. This functionality may be accessed by the client computer, such that the social networking server may act as an intermediary (see below figures) between the client computer and the image editing server.

In some example embodiments, augmenting may include the alignment of two more images based upon the continuity of bit values. For example, an image may be augmented with an additional image where the characteristics represented in each image is similar. Similarity may be based upon using a probability algorithm to determine if the characteristic is present in both images. This similarity may be based upon bits values, or metadata and the similarity between the bit values in the image and the additional image.

Example System

FIG. 1 is a diagram of an example system 100 used to generate image search results based upon a search request. Shown is a user 101 who utilizing any one of a number of devices 103 generates a search request 108. In one example embodiment, the any one of a number of devices 103 receives user input via an input device. The user input is used, in part, to generate the search request 108. These any one of a number of devices 103 may include a cell phone 104, a computer system 105, a television monitor 106, a Personal Digital Assistant (PDA) 131, or a Smartphone (not shown). These any one of a number of devices 103 are used to generate a GUI 107. This GUI 107 is used to generate a search request 108. The search request 108 may include a characteristic such as a color histogram, an image pattern, a bit value and associated codec, or macro-block coding. This characteristic may be formatted via a bit value format, a file format description, or a metadata format.

In some example embodiments, the search request 108 is transmitted across a network 109 to be received by an image editing server 110. Operatively coupled to this image editing server 110 is a digital content database 111. This digital content database 111 may reside natively on the image editing server 110, or may be a non-native database that is managed by a database server (not pictured). As illustrated, the image editing server 110 generates an image search 112 that is transmitted across a network 113. This network 113 may be a Local Area Network (LAN), a Wide Area Network (WAN), the Internet, or some other suitable network and associated topology. This image search 112 is received by a digital content server 114. This digital content server 114 may have a digital content database 115 that may reside natively on the digital content server 114, or may be a non-native digital content database 115 managed by a database server (not pictured). The image search 112 may be received by one or more devices 117. These one or more devices 117 include, for example, a cell phone 118, a computer system 119, a television or monitor 120, a PDA 121, or a Smartphone (not shown). A digital content database 122 may reside natively on the any one of these number of devices, 117 or may reside non-natively and be managed by some type of database server (not pictured). The digital content server 114 and the one or more devices 117 may be logically or physically connected to the image editing server 110 via the network 113.

In one example embodiment, the digital content server 114 may generate an image search result 116. This image search result 116 is transmitted back across the network 113 to be received by the image editing server 110. This image editing server 110 generates an image search results 123 based upon the image search result 116. A plurality of image search results 116 may be used to generate the image search results 123. The image search results 123 includes images (e.g., additional images) to be used to augment the image identified in the search request 108. This image search results 123 is transmitted across the network 109 to be received by the one or more devices 103.

Figure 2:
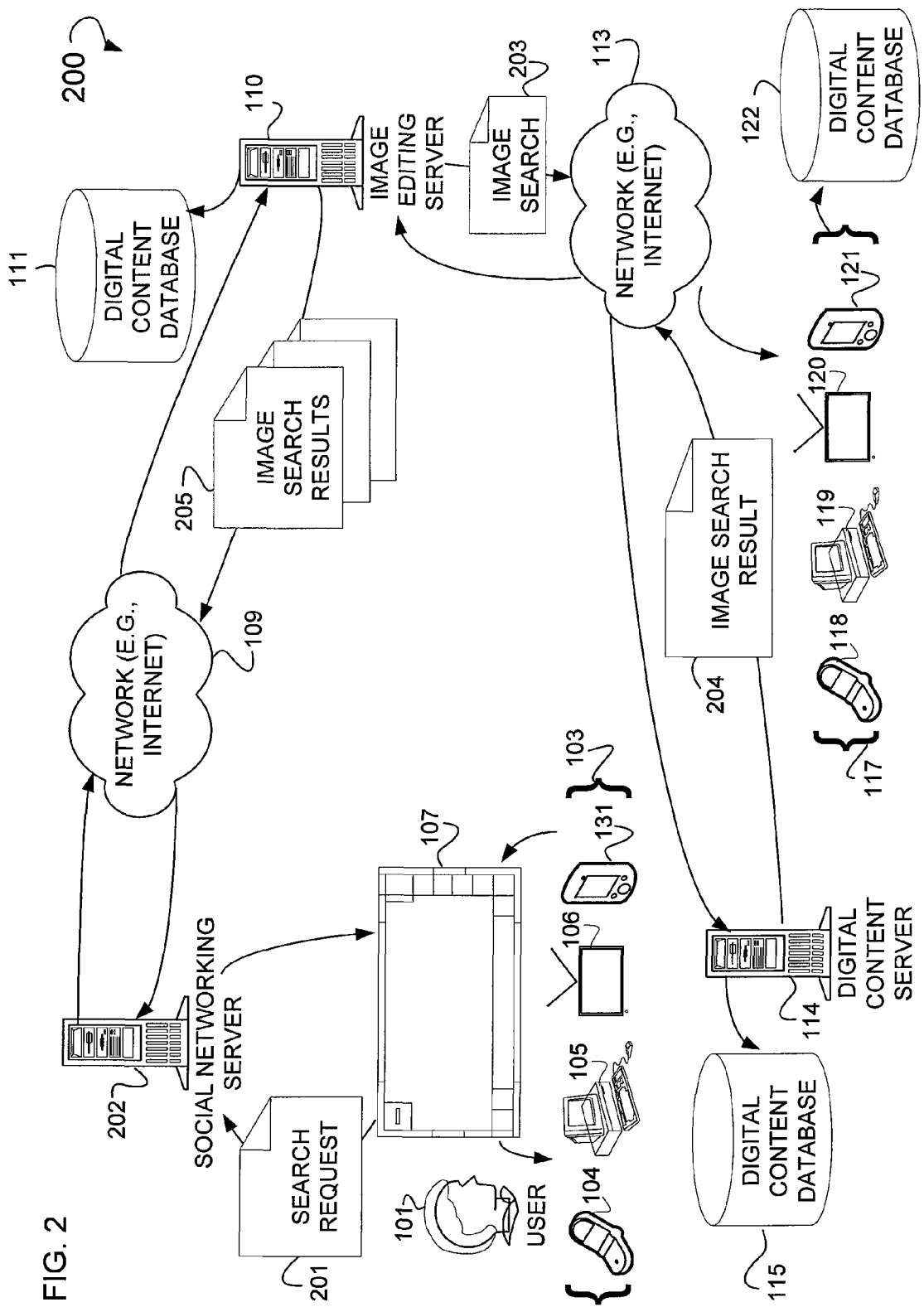
FIG. 2 is a diagram of a system, according to an example embodiment, used to generate image search results and to transmit these image search results using a social networking server.

FIG. 2 is a diagram of an example system 200 used to generate image search results, and to transmit these image search results using a social networking server. Shown is the one or more devices 103 and associated GUI 107 used to generate a search request 201. This search request 201 is transmitted by the one or more devices 103 to be received by a social networking server 202. The search result 201 is transmitted across a social network (not pictured). This social network may be a LAN, WAN, the Internet, or some other suitable network and associated topology. Social networking server 202 transmits the search request 201 across the network 109 to be received by the image editing server 110. The image editing server 110 generates an image search 203 that is transmitted and received by the previously illustrated digital content server 114, or one or more devices 117. An image search result 204 is generated by the digital content server 114 and transmitted back across a network 113 to be received by the image editing server 110. The image editing server 110 transmits an image search result 205 across the network 109 to be received by the social networking server 202. In some example embodiments, the image search results 205 may be generated, in part, based upon a plurality of image search results 204. The image search results 205 is placed or otherwise inserted into a webpage managed by the social networking server 202. The image search results 205 includes images (e.g., additional images) to be used to augment the image identified in the search request 201. Upon posting, the image search result becomes a posted augmented image. This webpage may be associated with the user 101.

Figure 3:
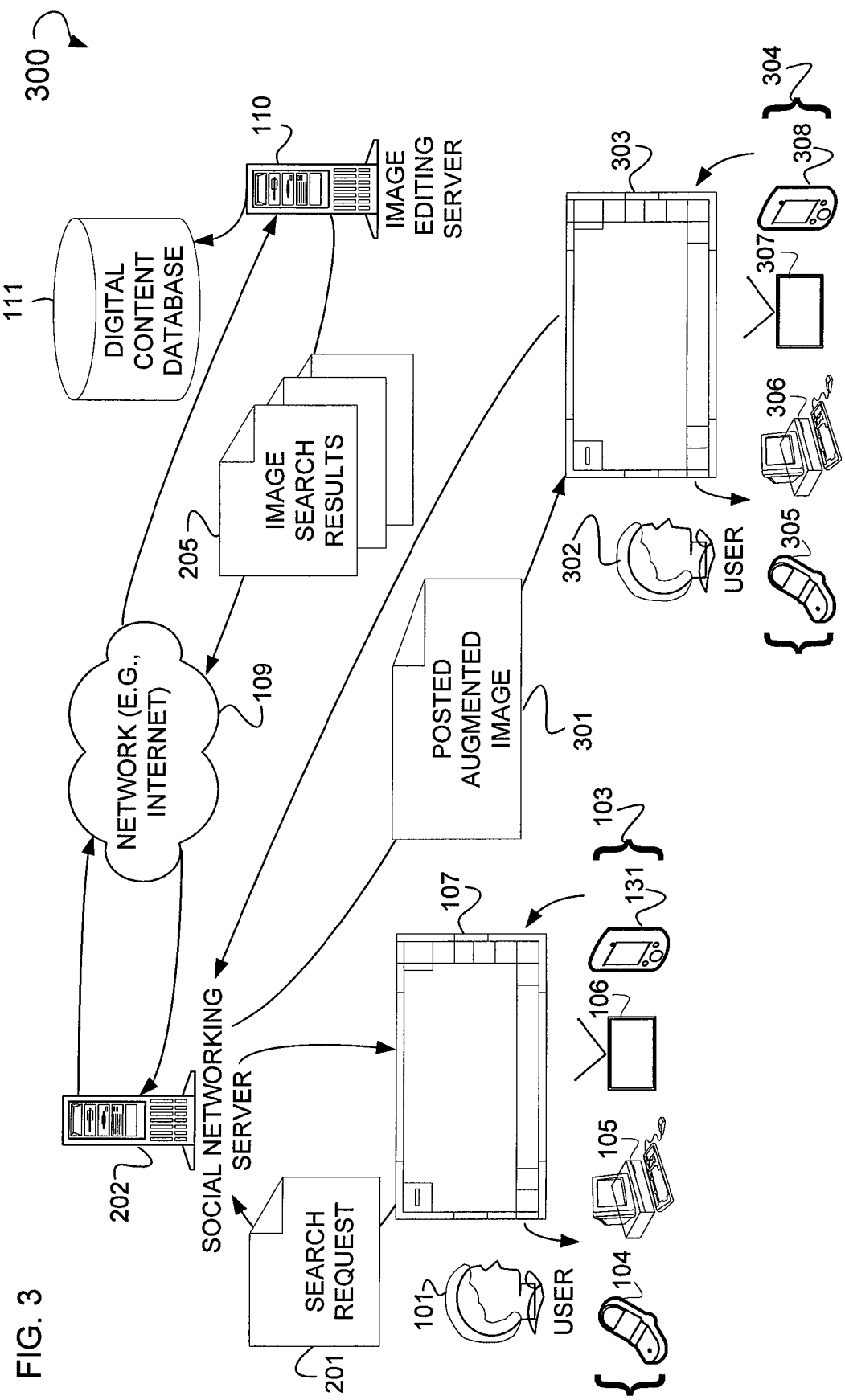
FIG. 3 is a diagram of a system, according to an example embodiment, used to post an augmented image on a webpage.

FIG. 3 is a diagram of an example system 300 used to post a modified image with a search result on a webpage. Shown is a user 302 who utilizing any one of a number of devices 304 views a posted augmented image 301. This posted augmented image 301 is displayed as part of a webpage associated with, for example, the user 101. This webpage may be generated by the social networking server 202 and may be served up across a social network (not pictured). The user 302 may be able to view the posted augmented image 301 using a GUI 303 that may be generated using the any one of a number of devices 304. These any one of a number of devices 304 may include a cell phone 305, a computer system 306, a television or monitor 307, a PDA 308, or Smartphone (not shown).

Example Interfaces

Figure 4:
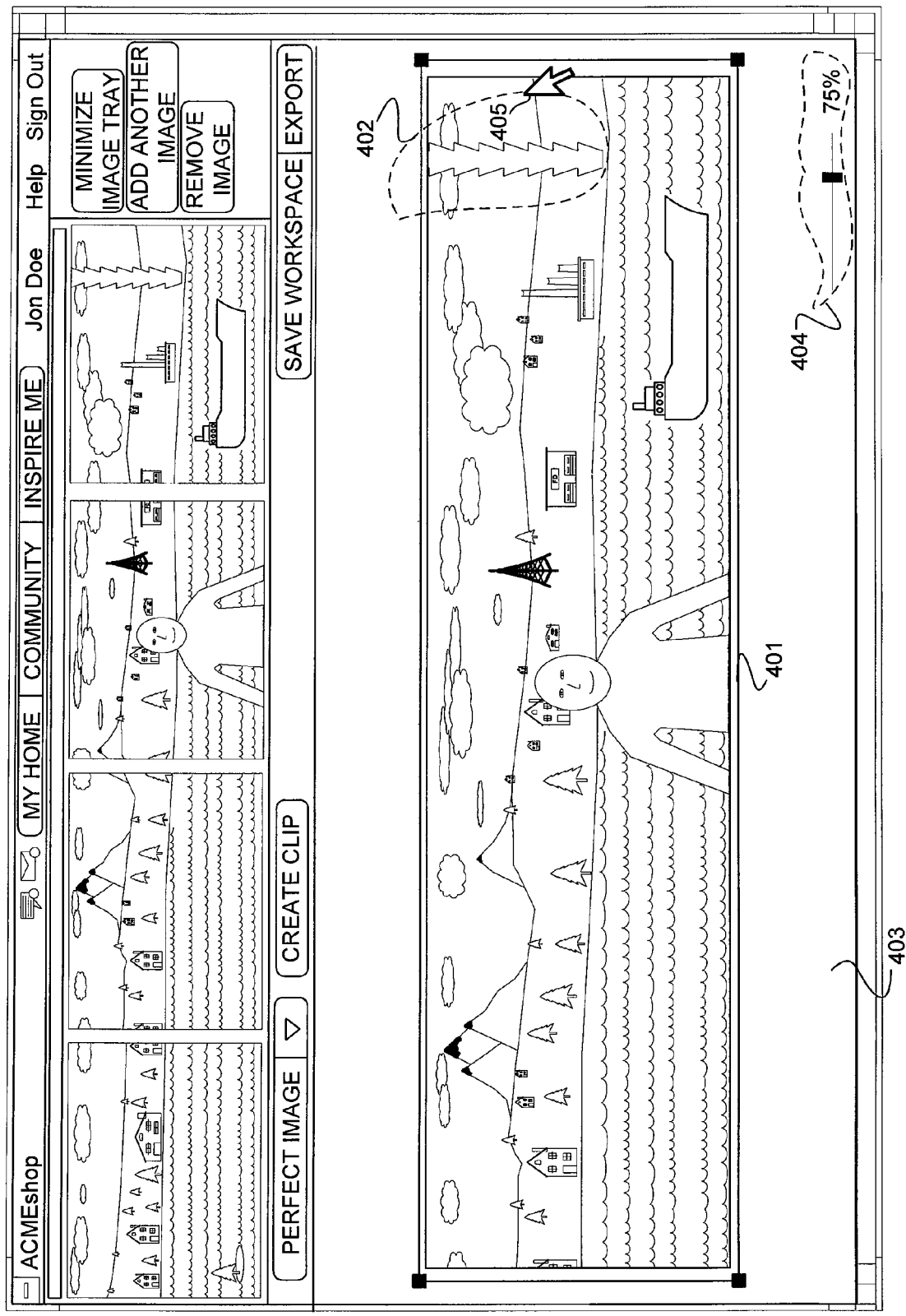
FIG. 4 is a diagram of a Graphical User Interface (GUI), according to an example embodiment, illustrating an image to be edited.

FIG. 4 is a diagram of an example GUI 107 illustrating an image to be edited. Shown is an image 401 that resides within a sub-frame 403. As used herein, a sub-frame is a display or display area. Further, a portion of an image 402 (e.g., an area within a display) is selected that will eventually serve as the basis for augmenting the image 401. Selecting may take the form of using a graphical pointer 405, and functionality associated therewith, to select (e.g., focus upon) the portion of the image 402. The portion of the image 402 may include image data (e.g., pixels) that include a characteristic. The characteristic includes at least one of a color histogram, image pattern, a bit value and associated codec, macro-block matching, or some other suitable characteristic. The characteristic may be formatted using a bit value format, a file format description (e.g., JPEG, TIFF, or GIF), or a metadata format (e.g., XML). In some example embodiments, the portion of the image 402 and image data may include an entire image such as image 401. Also shown is a screen object or widget 404 that allow for the increasing of the size of the image 401 displayed within the sub-frame 403.

Figure 5:
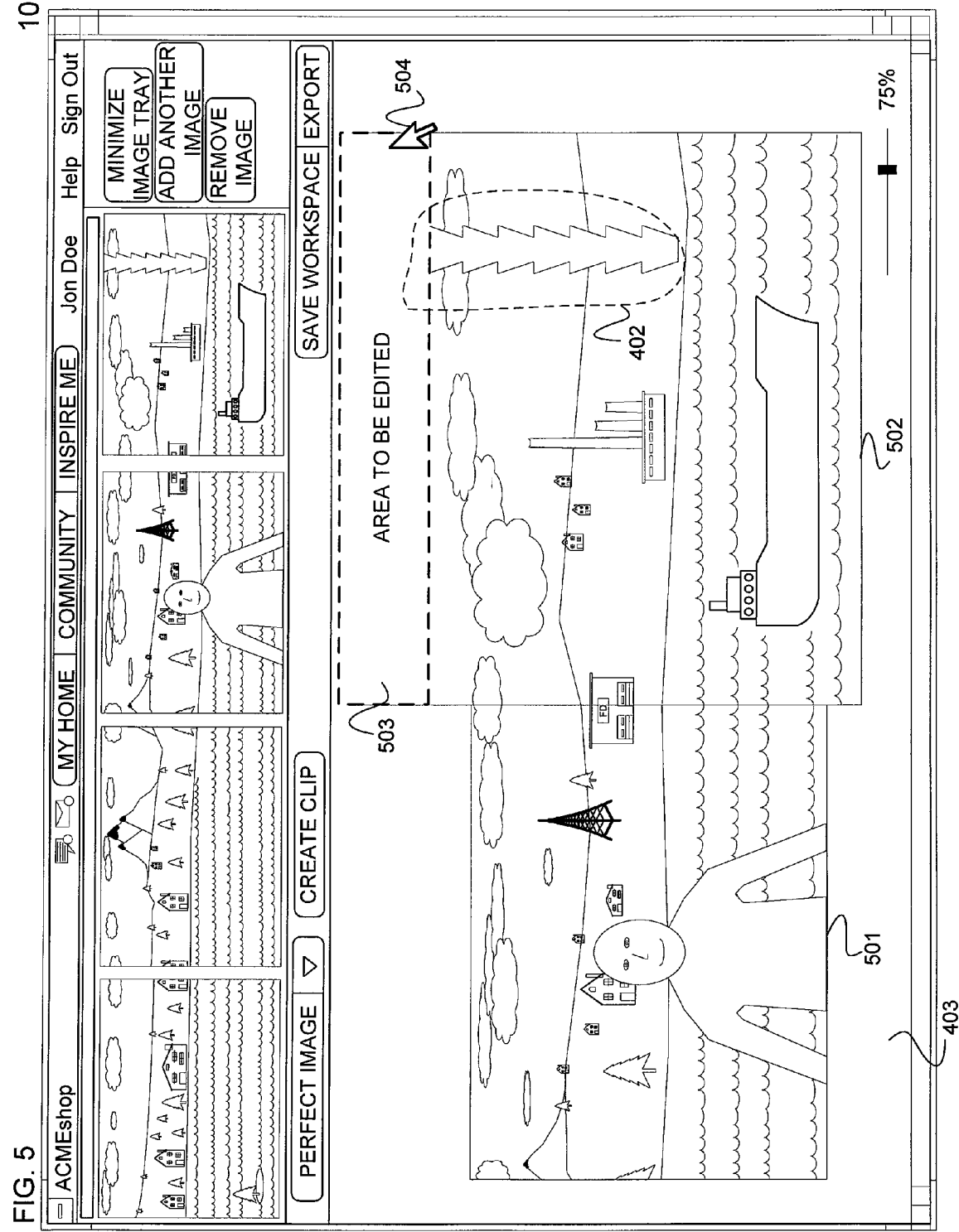
FIG. 5 is a diagram of a GUI, according to an example embodiment, showing an image to be edited and an associated editing area.

FIG. 5 is a diagram of an example GUI 107 showing an image to be edited and an associated editing area. Illustrated is an image 501 and image 502 (collectively the image 401). Using a graphical pointer 504, and functionality associated therewith, the image 502 may be selected (e.g., focused upon, or otherwise identified for augmentation) and an area 503 defined into which an additional image (or portion thereof) may be inserted to augment the image 502. The area 503 may be selected based upon the portion of the image 402, and the need to augments this portion of the image 402 with an additional image. The functionality associated with the graphical pointer 504 may include a click-and-drag functionality, a mouse-over functionality, or some other suitable functionality. This functionality may be facilitated through the use of some type of input device including, a mouse, light pen, keyboard, touch screen, or other suitable input device.

Figure 6:
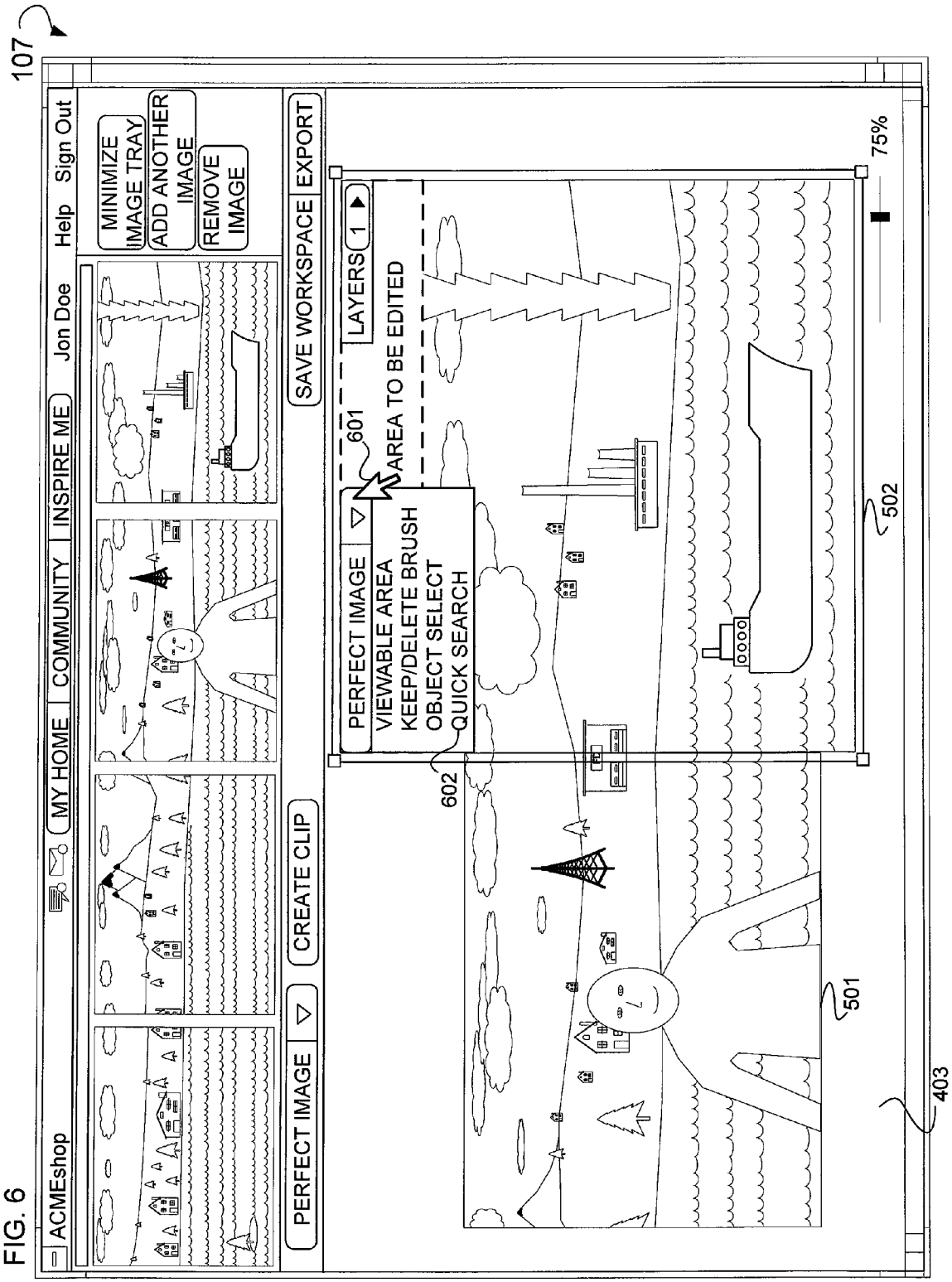
FIG. 6 is a diagram of a GUI, according to an example embodiment, illustrating various screen objects and widgets used to facilitate the augmentation of an image with a portion of an additional image.

FIG. 6 is a diagram of an example GUI 107 illustrating various screen object or widget used to facilitate the augmentation of an image with an additional image. Shown is a graphical pointer 601, and associated functionality, used to execute a screen object or widget in the form of a drop down menu. This drop down menu includes a selection 602 in the form of a quick search selection. Some other type of screen object or widget in lieu of a drop down menu may be used including a radio button, checkbox, or some other suitable screen object or widget.

Figure 7:
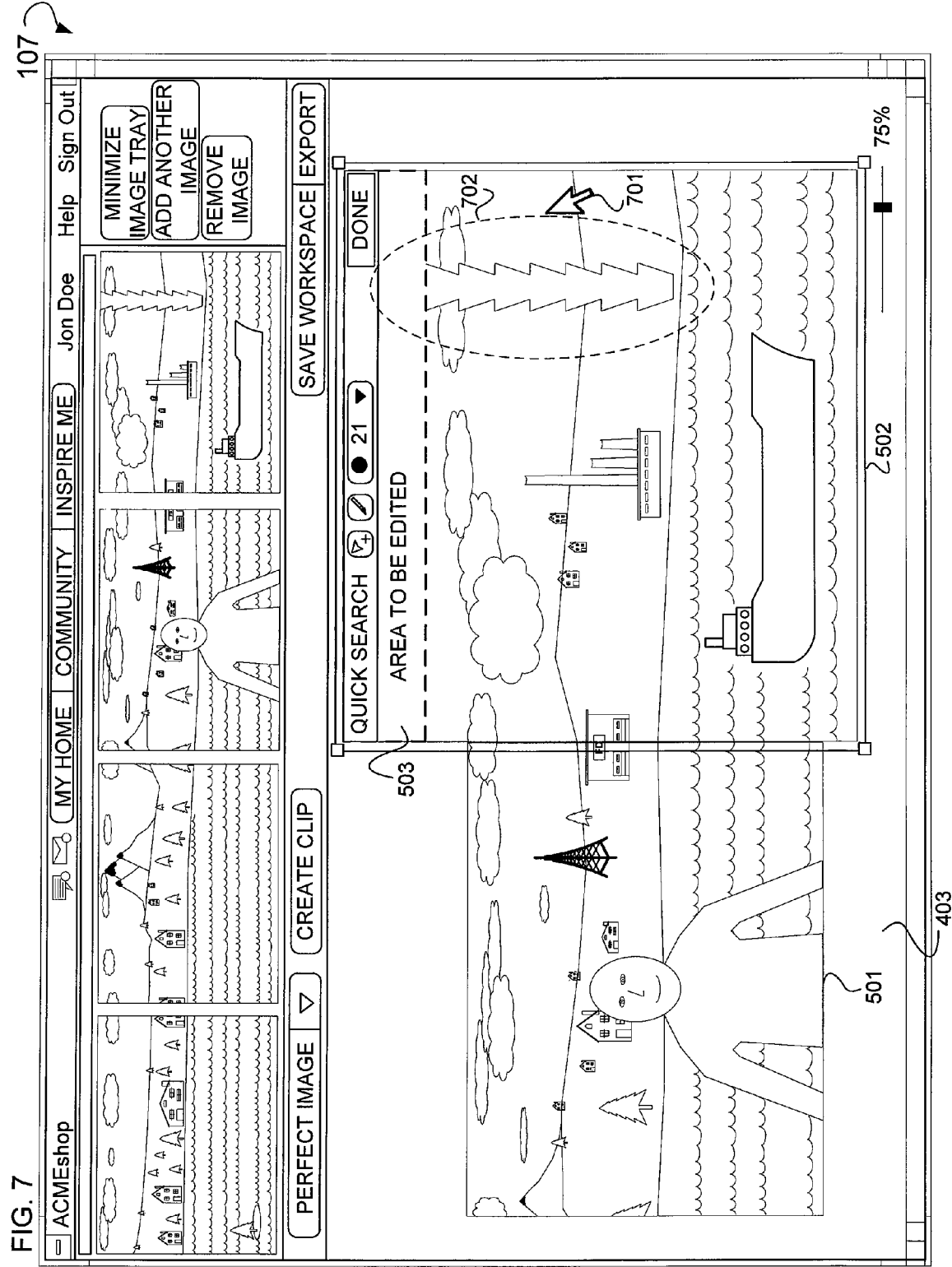
FIG. 7 is an illustration of a GUI, according to an example embodiment, used to select a portion of an image that may serve as a basis for augmenting the image.

FIG. 7 is an illustration of an example GUI 107 used to select a portion of an image within an image that may serve as a basis for augmenting the image. Shown is a graphical pointer 701 that is used to select a portion of the previously illustrated image 502. Here, the graphical pointer 701 is used to highlight an object within the image 501. This object is illustrated herein at 702. As will be more fully illustrated below, this object will serve as a basis for augmenting the image 502.

Figure 8:
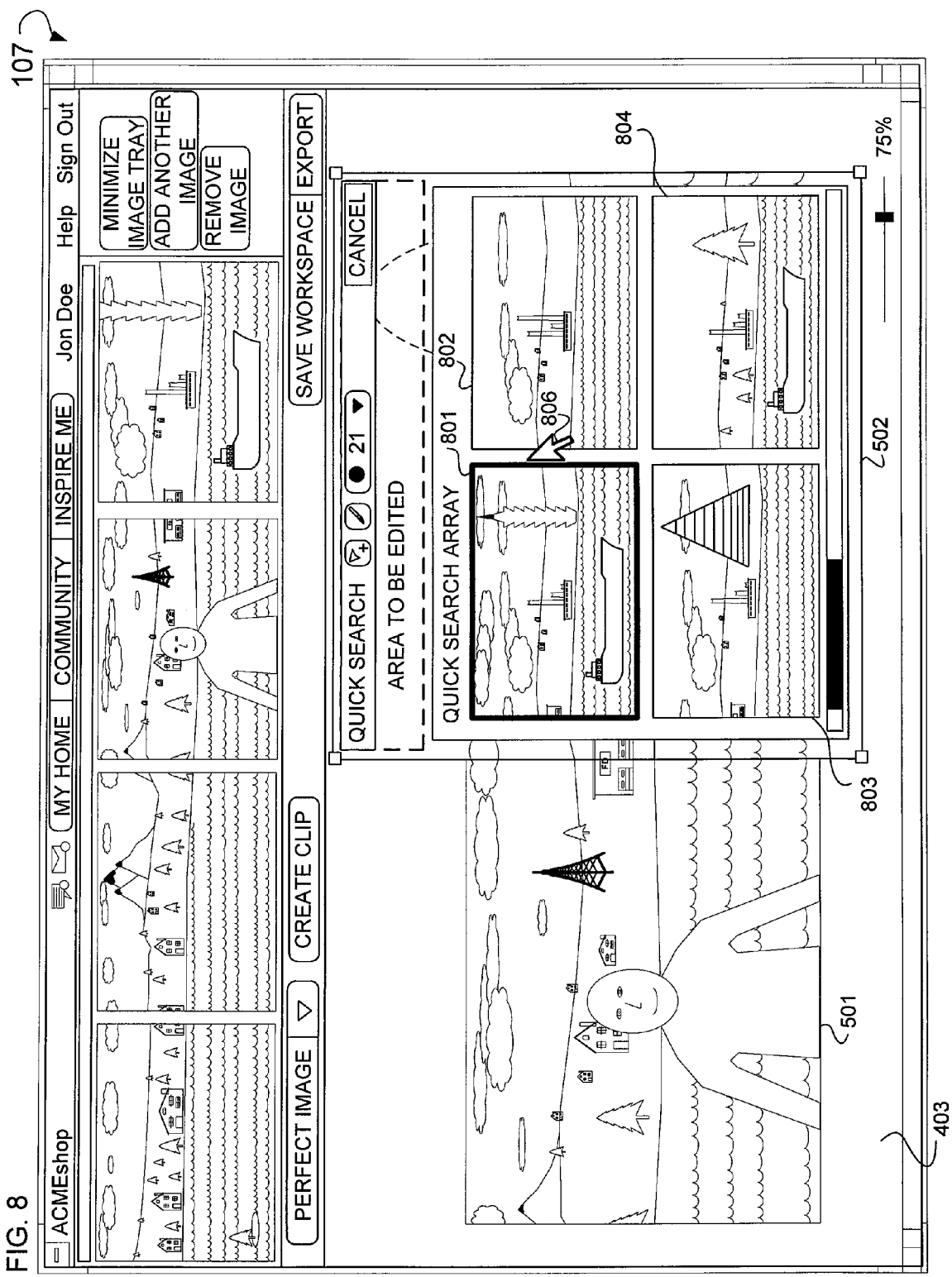
FIG. 8 is a diagram of a GUI, according to an example embodiment, used to select an image to be used in augmenting another image.

FIG. 8 is a diagram of an example GUI 107 used to select an image to be used in augmenting another image. Shown is an image 801, an image 802, an image 803, and an image 804. These images 801-804 may be displayed as part of the image search results 123 or 205. These images may be displayed as a part of a quick search array. This quick search array may appear within some type of sub-frame associated with the GUI 107. Here sub-frame 805 includes the quick search array of images (e.g., images 801-804). Using a graphical pointer 806 the image 801 may be highlighted, or otherwise focused upon. This image 801, as will be more fully illustrated below, may be used to augment the image 502.

Figure 9:
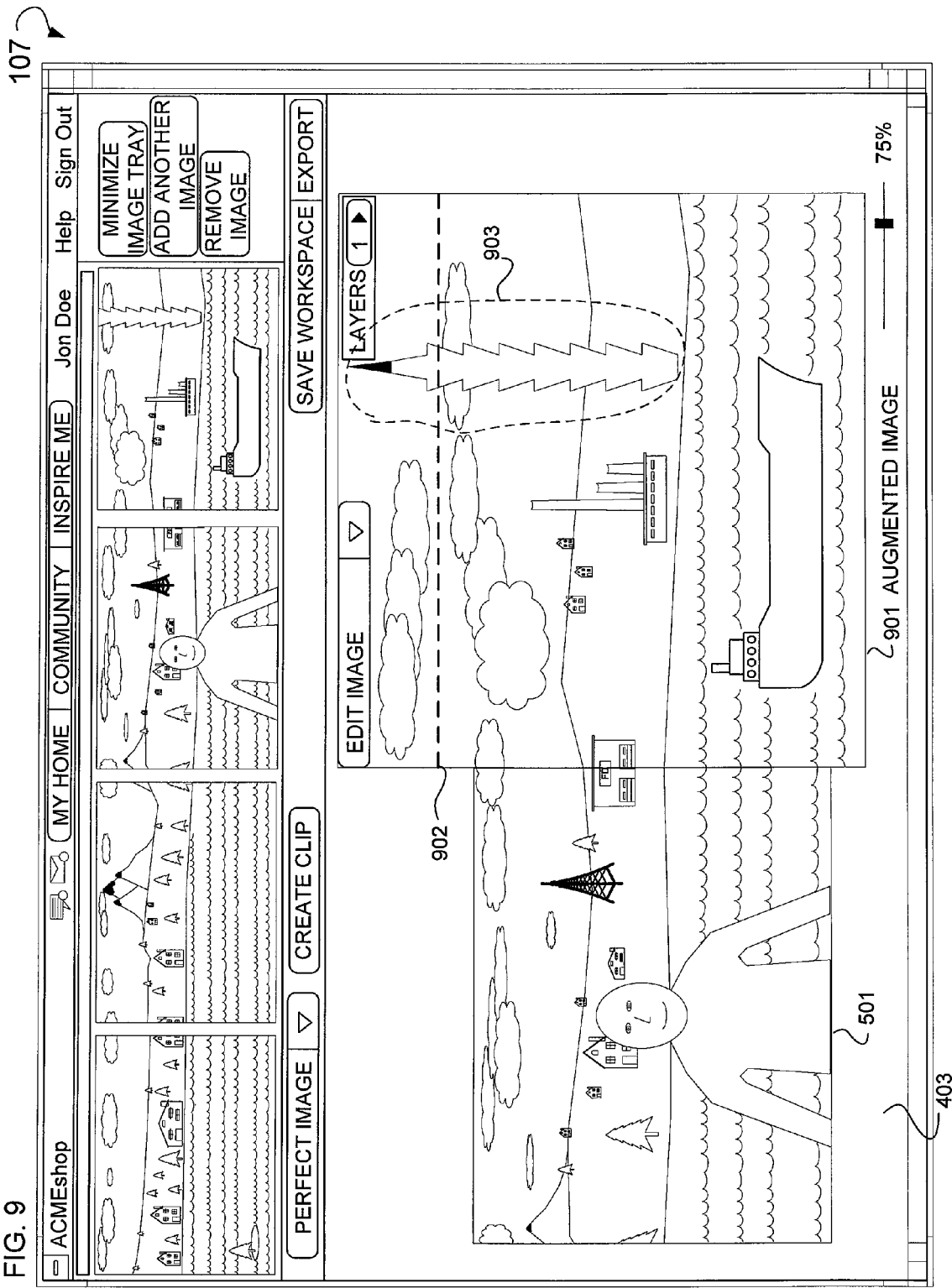
FIG. 9 is an illustration of a GUI, according to an example embodiment, showing an augmented image.

FIG. 9 is an illustration of an example GUI 107 showing an augmented image. Illustrated is an augmented image 901 that has been augmented with the previously illustrated image 801. Specifically, a portion is added from the image 801, illustrated as the portion of the augmented image 901 existing above the line 902. Further, the portion of the augmented image 901 is also illustrated at 903 wherein an object, and characteristics associated therewith, existing as part of the image 502 has been augmented with a portion of the image 801. This process for augmentation is more fully illustrated below.

Example Logic

Figure 10:
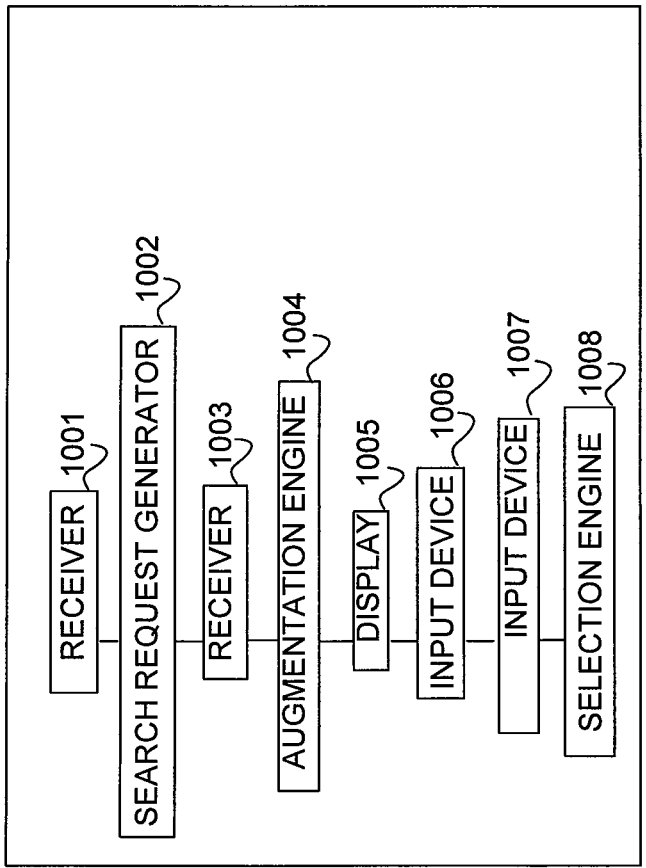
FIG. 10 is a block diagram of a computer system, according to an example embodiment, used to generate an augmented image.

FIG. 10 is a block diagram of an example computer system 1000 used to generate an augmented image. The blocks illustrated herein may be implemented in hardware, firmware, or software. These blocks may be implemented by the one or more devices 103, or the social networking server 202. Further, these blocks are communicatively coupled via a logical or physical connection. Illustrated is a computer system 1000 including a receiver 1001 to receive image data that identifies a characteristic of a portion of a first image, the first image displayed as part of a GUI. Communicatively coupled to the receiver 1001 is a search request generator 1002 to generate a search request for a second image based upon the characteristic. Communicatively coupled to the search request generator 1002 is a receiver 1003 to receive an image search result that includes at least the second image, the second image displayed as part of an image array within the GUI. Further, communicatively coupled to the receiver 1003 is an augmentation engine 1004 to augment the first image with the second image, based upon the characteristic, to create an augmented image. A display 1005 is communicatively coupled to the augmentation engine 1004 such that the display 1005 displays the augmented image within the GUI. An input device 1006 is communicatively coupled to the display 1005 to be used to select an area of the first image to be augmented. The portion of the image 402 may be this area of the first image. An input device 1007 is communicatively coupled to the display 1005 to be used to select the second image from the image array. In some example embodiments, the input device 1006 and input device 1007 may be the same input device. A selection engine 1008 is communicatively coupled to the input device 1006 such that the selection engine 1008 selects the second image from the image array through the use of a probability algorithm. In some example embodiments, the characteristic is formatted in a format that includes at least one of a bit value format, a file format description, or a metadata format. Additionally, in some example embodiments, the characteristic includes at least one of a color histogram, an image pattern, a bit value and associated codec, or macro-block matching.

Figure 11:
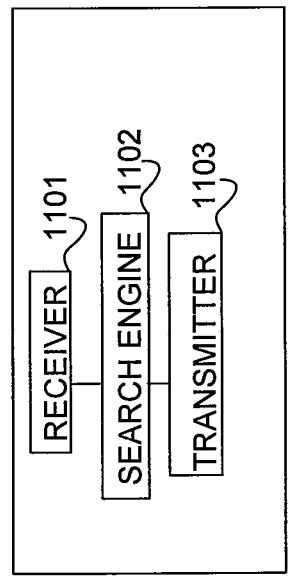
FIG. 11 is a block diagram of a computer system, according to an example embodiment, used to search for an additional image to be used in the generation of an augmented image.

FIG. 11 is a block diagram of an example computer system 1100 used to search for an additional image to be used to generate an augmented image. The blocks illustrated herein may be implemented in hardware, firmware, or software. These blocks may be implemented by the image editing server 110, or social networking server 202. Further, these blocks are communicatively coupled via a logical or physical connection. Illustrated is a computer system 1100 including a receiver 1101 to receive a search request that includes image data that identifies a characteristic of a portion of a first image. Communicatively coupled to this receiver 1101 is a search engine 1102 to conduct a search for a second image, the search to include the use of a probability algorithm to determine an existence of the characteristic in the second image. This probability algorithm is more fully illustrated below. Communicatively coupled to this search engine 1102 is a transmitter 1103 to transmit an image search result that includes the second image, the second image to augment the first image. In some example embodiments, the search includes a search of at least one of a network, or of a database. A network may include the network 109. The database may include the digital content database 111 115, or 122.

Figure 12:
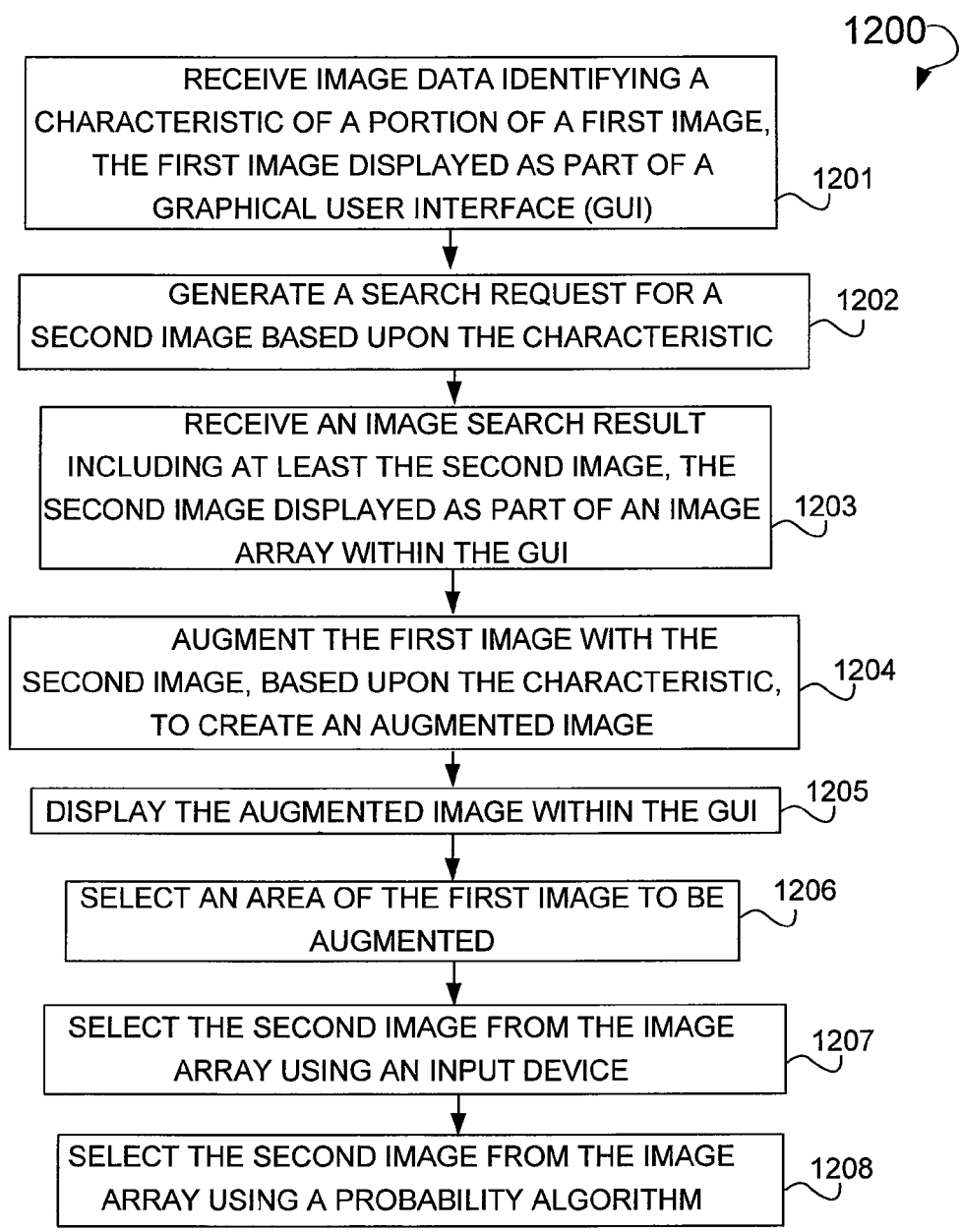
FIG. 12 is a method, according to an example embodiment, used to generate an augmented an image.

FIG. 12 is an example method 1200 to generate an augmented image. The various operations outlined below may be implemented by the one or more devices 103, or the social networking server 202. The GUI 107 and input device may be used in conjunction with this method 1200. Shown is an operation 1201 that, when executed, receives image data identifying a characteristic of a portion of a first image, the first image displayed as part of a GUI. An operation 1202 is executed to generate a search request for a second image based upon the characteristic. An operation 1203 is executed to receive an image search result including at least the second image, the second image displayed as part of an image array within the GUI. Operation 1204 is executed to augment the first image with the second image, based upon the characteristic, to create an augmented image. Operation 1205 is executed to display the augmented image within the GUI. Operation 1206 is executed to select an area of the first image to be augmented. The portion of the image 402 may be this area of the first image. Operation 1207 is executed to select the second image from the image array using an input device. Additionally, operation 1208 is executed to select the second image from the image array using a probability algorithm. In some example embodiments, the characteristic is formatted in a format including at least one of a bit value format, a file format description, or a metadata format. Further, in some example embodiments, the characteristic includes at least one of a color histogram, an image pattern, a bit value and associated codec, or macro-block matching.

Figure 13:
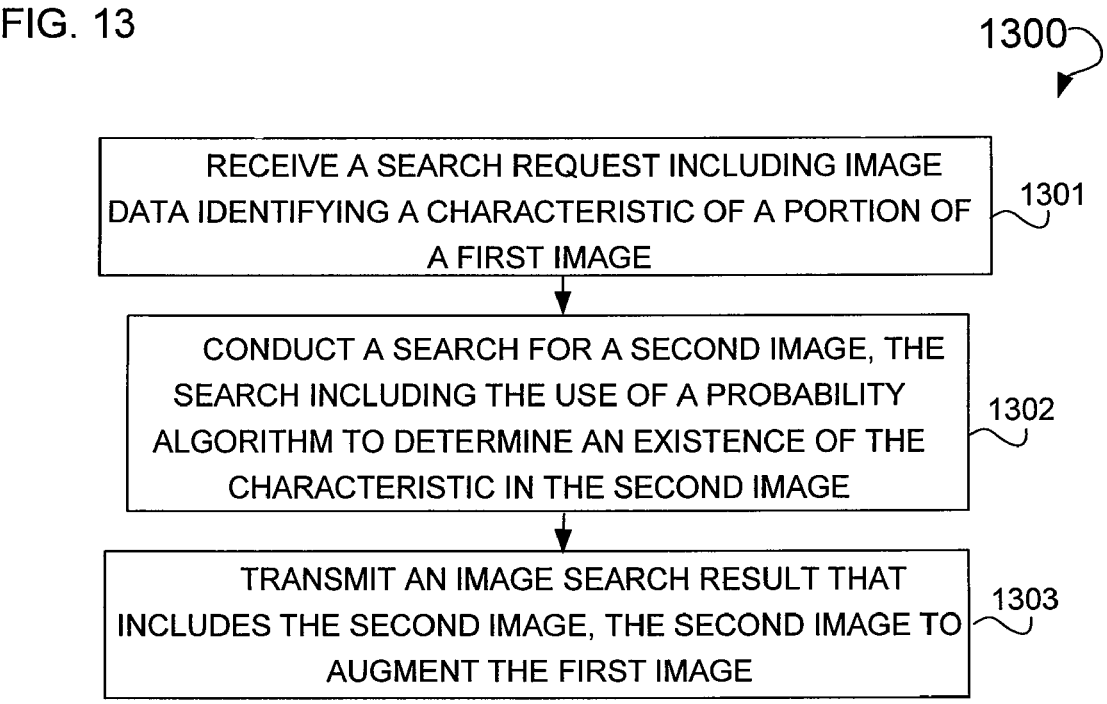
FIG. 13 is a method, according to an example embodiment, used to search for an additional image to be used in the generation of an augmented image.

FIG. 13 is an example method 1300 to search for an additional image to create an augmented image. The various operations outlined below may be implemented by image editing server 110, or social networking server 202. Shown is an operation 1301 that, when executed, receives a search request including image data identifying a characteristic of a portion of a first image. An operation 1302 is executed that conducts a search for a second image, the search including the use of a probability algorithm to determine an existence of the characteristic in the second image. An operation 1303 is shown that, when executed, transmits an image search result that includes the second image, the second image to augment the first image. In some example embodiments, the search includes a search of at least one of a network, or of a database. A network may include the network 109. The database may include the digital content database 111 115, or 122.

Figure 14:
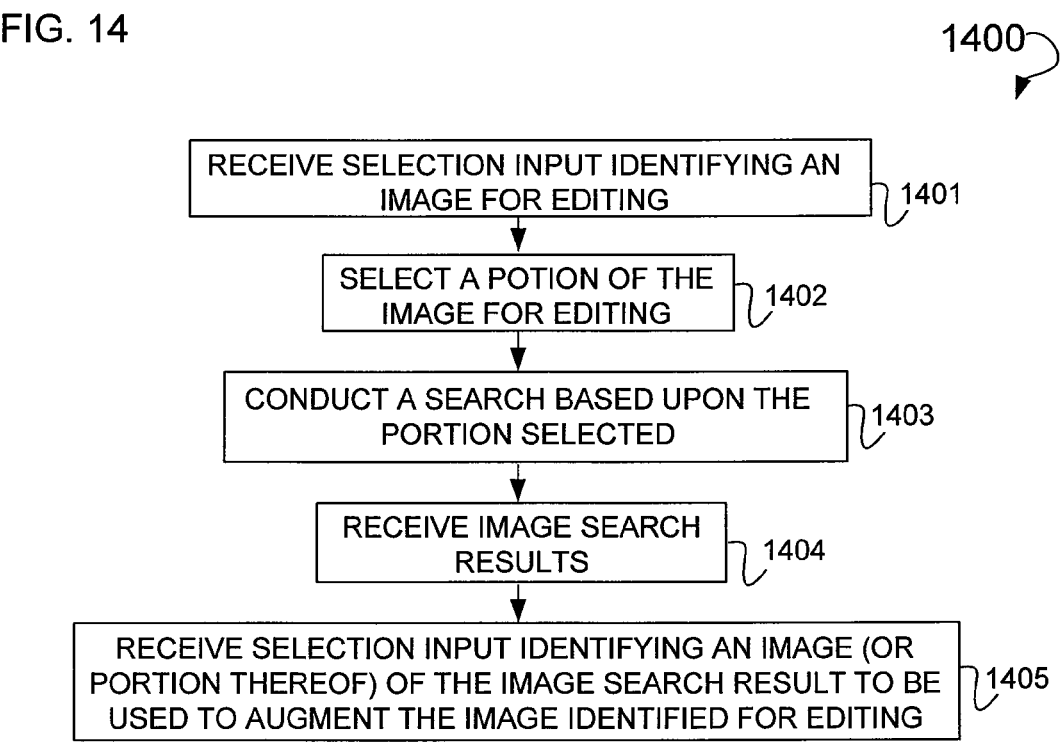
FIG. 14 is a flowchart illustrating a method, according to an example embodiment, used to augment an image identified for editing.

FIG. 14 is a flowchart illustrating an example method 1400 used to augment an image identified for editing. Shown is an operation 401 that, when executed, receives selection input identifying an image for editing. This section input may be generated via some type of input device as previously illustrated. An operation 1402 is executed that selects a portion of an image for editing. This portion of an image for editing is selected using the previously shown input device in combination with, for example, a graphical pointer and functionality associated therewith. As illustrated above, a portion may be the portion of the image 402. An operation 1403 is executed that conducts a search based upon the portion selected at operation 1402. This search may include searching a computer system physically or logically connected to a network. In the alternative, this search may include the searching of a database. An operation 1404 is executed that receives search results based upon the searching conducted at operation 1403. An operation 1405 is executed that receives selection input identifying an image, or portion of an image, from the search results that may be used to augment the image identified for editing. These various operations 1401-1405 may be executed by the one or more devices 103, the image editing server 110, or some combination of these computer systems.

Figure 15:
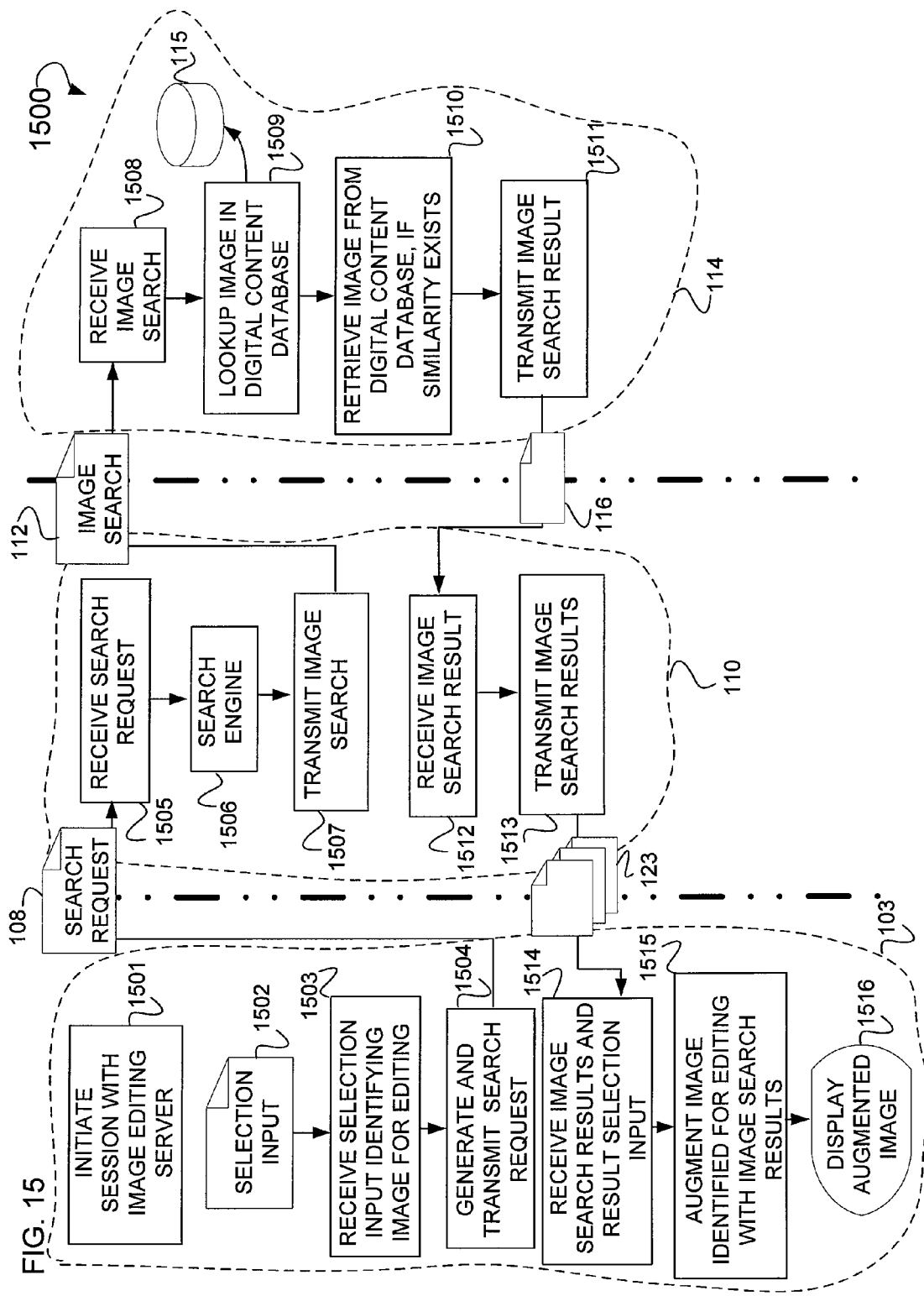
FIG. 15 is a tri-stream flowchart illustrating a method, according to an example embodiment, used to generate and display an augmented image.

FIG. 15 is a tri-stream flowchart illustrating an example method 1500 used to generate and display an augmented image 901. Shown is an operation 1501, 1503, 1504, 1514 and 1515, as well as a display 1516, that are executed by a plug-in and the one or more devices 103. Also shown are operations 1505-1507 and 1512-154 that are executed by the image editing server 110. Further, shown are operations 1508-1511 that are executed by the digital content server 114, or the one or more devices 117.

In one example embodiment, an operation 1501 is executed that initiates a session within the image editing server 110. This session may be a Transmission Control Protocol/Internet Protocol (TCP/IP) session, a login session, or some other suitable session. Selection input 1502 may be generated using some type of input device. This selection input 1502 is received through the execution of an operation 1503. The operation 1503 receives selection input identifying an image for editing (e.g., the image 502). An operation 1504 is executed that generates and transmits the search request 108. This search request 108 is received through the execution of operation 1505. Operation 1506 is executed that act as a search engine to search a database, or devices physically or logically connected to a network, for an image that has characteristics in common with the image 502. An operation 1507 is executed that transmits the image search 112. This image search 112 is received through the execution of operation 1508. An operation 1509 is executed that conducts a lookup in a database, such as the digital content database 115, of the image identified within the image search 112. An operation 1510 is executed that retrieves this image from a digital content database where a similarity exists. A similarity may be a common characteristics based upon a probability value. This process for lookup (e.g., the executed operation 1509) and retrieval as denoted within the operation 1510 may be executed using a Structured Query Language (SQL). An operation 1511 is executed that transmits the image search 116. An operation 1512 is executed that receives the image search result 116. Operation 1513 is executed that transmits the image search results 123. As previously illustrated, these image search results 123 may be generated from a plurality of the image search result 116. Operation 1514 is executed that receives an image search result and a result selection input. This result selection input may be the selection of the image 801 using the graphical pointer 806 as illustrated in FIG. 8. An operation 1515 is executed to augment an image identified for editing (e.g., the image 502) with an image search result or portion thereof (e.g., the image 801). A display 1516 is executed to display the augmented image as the augmented image 901.

Figure 16:
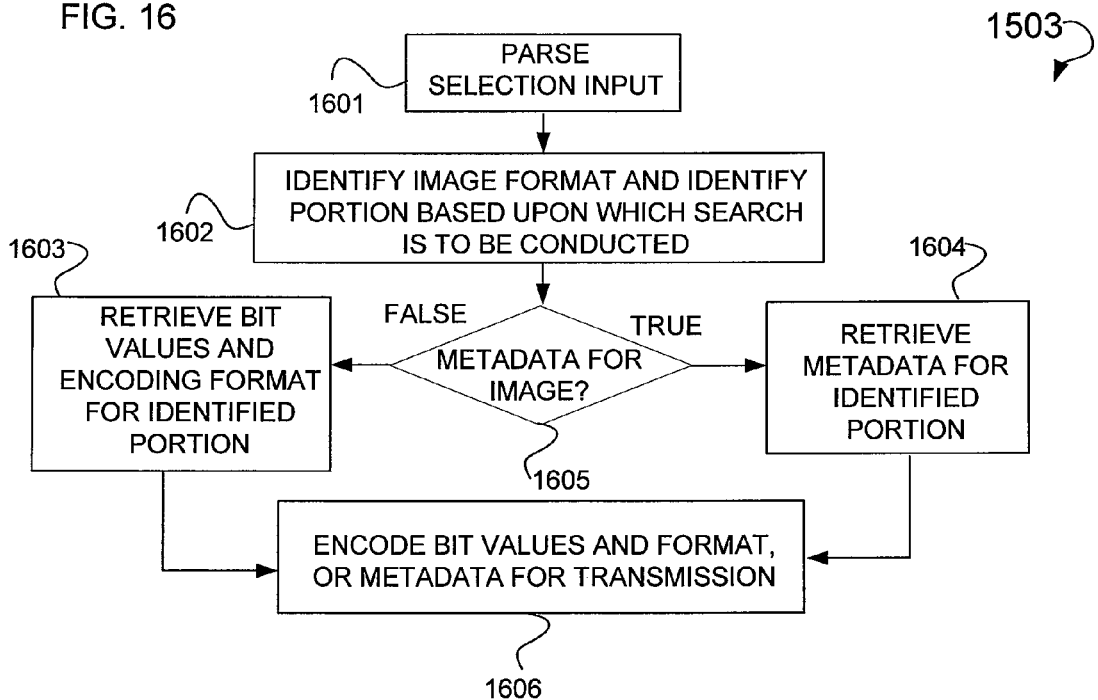
FIG. 16 is a flowchart illustrating the execution of an operation, according to an example embodiment, that receives selection input identifying an image for editing.

FIG. 16 is a flowchart illustrating the example execution of operation 1503. Shown is an operation 1601 that, when executed, parses selection input. An operation 1602 is executed that identifies an image format and identifies a portion of an image based upon which a search is to be conducted. An image format may be the codec used to format the bits that make up an image. A decisional operation 1605 is executed to determine whether metadata exist for the image. The metadata may written in XML and may include the characteristic for the portion of the image 402. In cases where decisional operation 1605 evaluates to "true," an operation 1604 is executed. In cases where decisional operation 1605 evaluates to "false," an operation 1603 is executed. In cases where operation 1604 is executed, metadata is retrieved for the identified portion of the image upon which a search is to be conducted. In cases where operation 1603 is executed, bit values and a coding format for the identified portion may be retrieved. Operation 1606 is executed that encodes bit values and format, or metadata for transmission.

Figure 17:
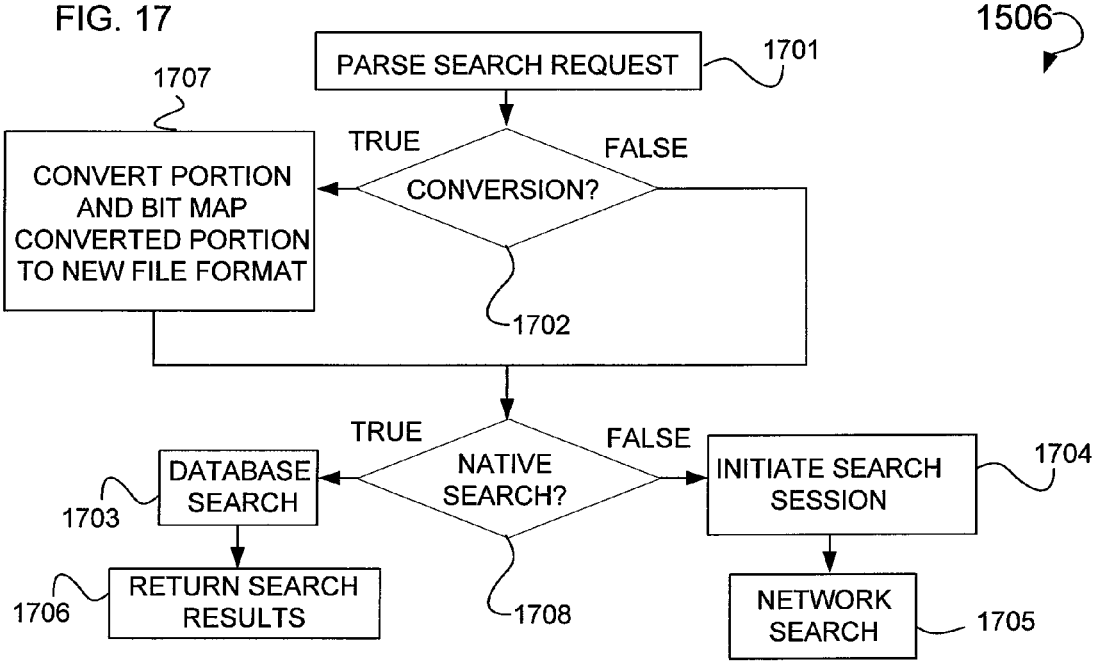
FIG. 17 is a flowchart illustrating the execution of an operation, according to an example embodiment, that act as a search engine to search for an image.

FIG. 17 is a flowchart illustrating the example execution of operation 1506. Shown is an operation 1701 that parses a search request. A decisional operation 1702 is executed to determine whether or not a conversion between file formats (e.g., codecs) is required. In cases where decisional operation 1702 evaluates to "true," an operation 1707 is executed that converts the portion of the image and bit map associated therewith into a new file format. In some example embodiments, a conversion may take place to convert from a JPEG format to a TIFF format, from a TIFF format to a JPEG format, from a GIF codec to a JPEG format, or some other suitable conversion. The operation 1707 may use the JPEG baseline algorithm or some other suitable algorithm. In cases where decisional operation 1702 evaluates to "false," a further decisional operation 1708 is executed. This decisional operation 1708 determines whether or not a native search is to occur. A native search may include a search of a database that may reside natively upon the image editing server 110. In cases where decisional operation 1708 evaluates to "true," an operation 1703 is executed. In cases where decisional operation 1708 evaluates to "false," an operation 1704 may be executed. In cases where operation 1703 is executed, a database search may be conducted. This database search may include using the previously referenced SQL. Operation 1704, when executed, initiates a search session. This search session may includes the generation of a TCP/IP session between the image editing server 110 and a digital content server 114, and/or the one or more devices 117. In some cases, a login session or other suitable session may be generated. An operation 1706 is executed that returns search results from the execution of the operation 1703. An operation 1705 is executed to conduct a network search of, utilizing, for example, the digital content server 114 and/or the one or more devices 117. In some example embodiments, a probability algorithm may be used in the execution of operations 1703 and 1704.

In some example embodiments, the execution of operations 1703 and 1704 utilize characteristics in common between an image (e.g., a first image) and an additional image that is used to the augment the image. These characteristics in common may include at least one of a bit value, a file format description, or a metadata value. The bit values and file format descriptions may include a mapping between the bits and associated format of the image and the additional image to determine the characteristics in common between the image and the additional image. The metadata values may be written in XML and may describe a common color histogram, common patterns in the image and additional image, common bit values and formats, macro block matching, or some other suitable characteristic in common between the image and the additional image. One or more probability algorithms (see below) may be used to determine characteristics in common between the image and the additional image.

Figure 18:
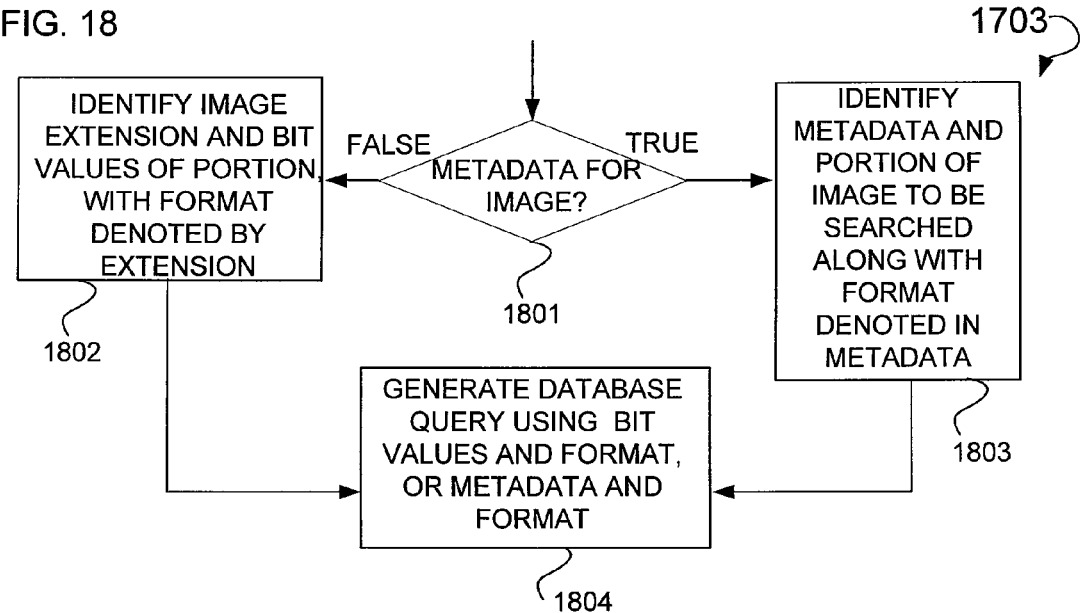
FIG. 18 is a flowchart illustrating the execution of an operation, according to an example embodiment, to conduct a database search.

FIG. 18 is a flowchart illustrating the example execution of operation 1703. Shown is a decisional operation 1801 that determines whether or not metadata exists for an image. In cases where decisional operation 1801 evaluates to "false," an operation 1802 is executed. In cases where decisional operation 1801 evaluates to "true," an operation 1803 is executed. Operation 1802, when executed, identifies an image extension in bit values of a portion of the image with the extension denoting a file format. When operation 1803 is executed, metadata relating to a portion of an image to be searched is identified along with the format of the image as determined by the metadata. An operation 1804 is executed that generates a database query using, for example, bit values and the format information relating to the bit values (e.g., the format reflected in the codec).

Figure 19:
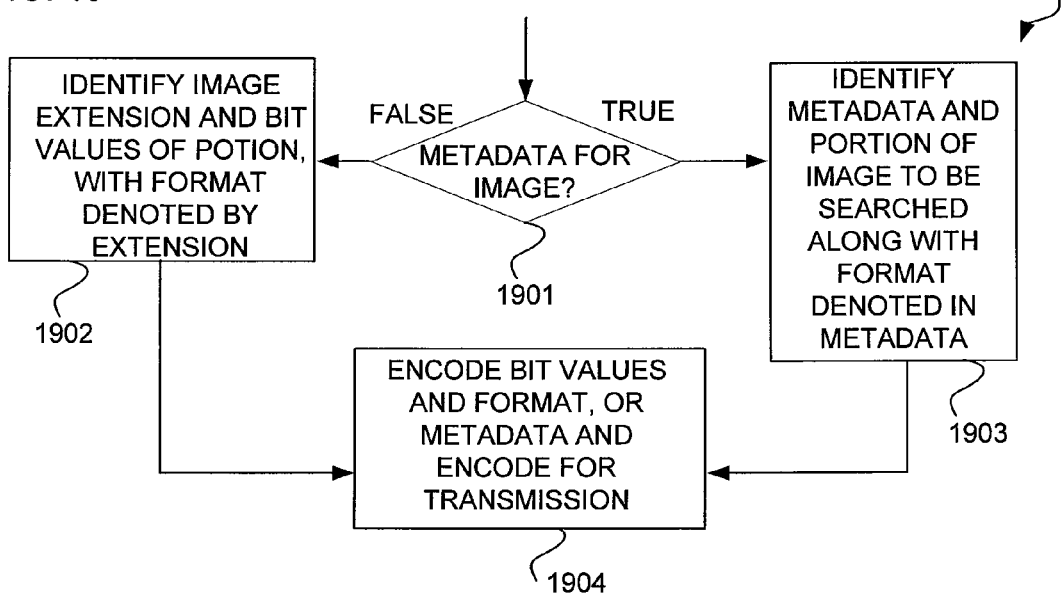
FIG. 19 is a flowchart illustrating the execution of an operation, according to an example embodiment, to conduct a network search.

FIG. 19 is a flowchart illustrating the example execution of operation 1705. Shown is a decisional operation 1901 that determines whether or not metadata exists for an image. In cases where decisional operation 1901 evaluates to "false," an operation 1902 is executed. In cases where decisional operation 1901 evaluates to "true," an operation 1903 is executed. Operation 1902, when executed, identifies an image extension and bit values for portion of image as denoted by an extension. In cases where operation 1903 is executed, metadata is identified as well as a portion of the image to be searched as denoted by the metadata. An operation 1904 is executed that encodes bit values, and a format and metadata for transmission. This encoding may utilize any one of a number of protocols as outlined within the TCP/IP protocol stack model or, for example, the Open Systems Interconnection Basic Reference (OSI) model.

Figure 20:
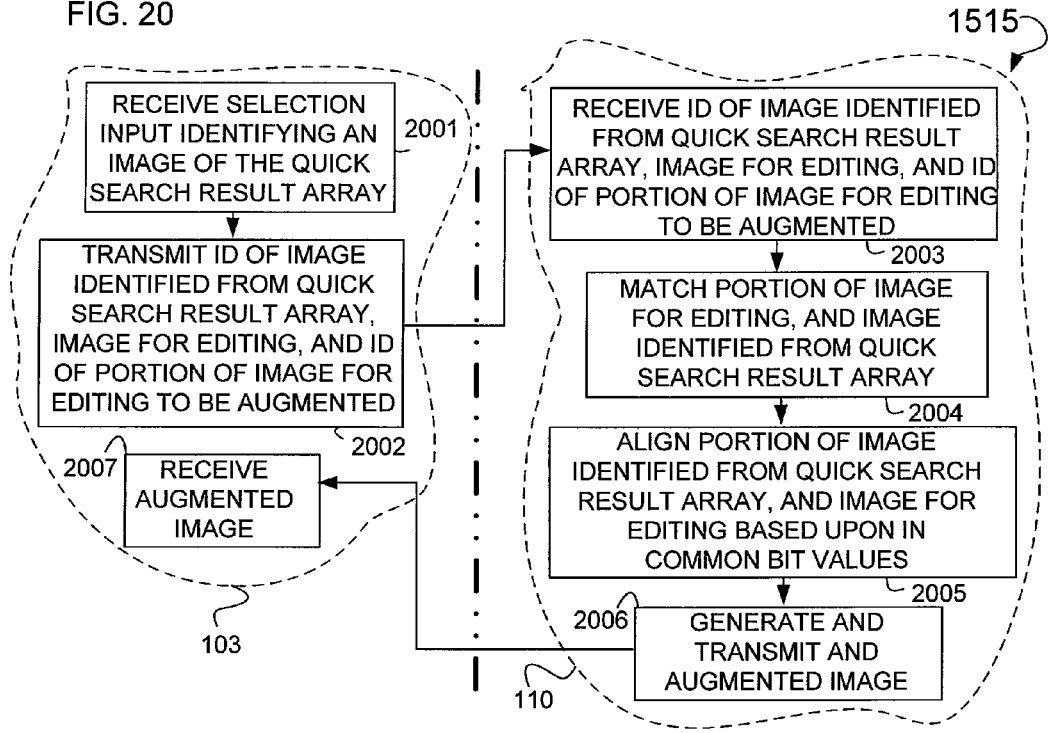
FIG. 20 is a dual-stream flowchart illustrating the execution of operation, according to an example embodiment, to augment an image identified for editing with an image search result or portion thereof.

FIG. 20 is a dual-stream flowchart illustrating the example execution of operation 1515. Shown is an operation 2001, 2002 and 2007 that may be executed by the one or more devices 103. Also shown are operations 2003-2006 that may be executed by the image editing server 110. An operation 2001 is executed that receives selection input identifying an image of the quick search results array. This selection input is generated, as previously illustrated, by some type of input device (see e.g., FIG. 8). An operation 2002 is executed that transmits an ID of an image identified from the quick search result array and additionally transmit the image for editing and an ID related to the portion of the image for editing to be augmented. An operation 2003 is executed that receives the ID of the image identified from the quick search result array, the image for editing and the ID of the portion of the image for editing to be augmented. An operation 2004 is executed that matches a portion of the image for editing and the image identified from the quick search result array. An operation 2005 is executed that aligns the portion of the image identified from the quick search result array and the image for editing based upon common values. A common characteristic may be a common value. In one example embodiment, common groups of bit values may denote commonality of color between the image identified from the quick search result array, and the image for editing. An operation 2006 is executed that generates and transmits the augmented image 901. An operation 2007 is executed that receives the augmented image 901.

Figure 21:
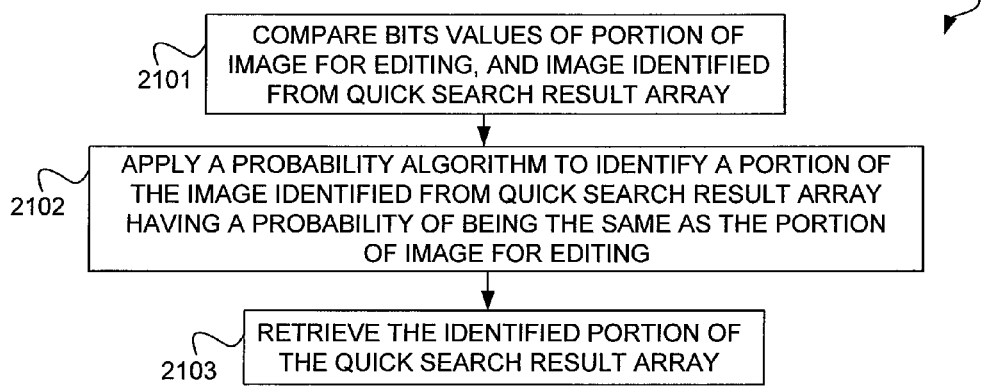
FIG. 21 is a flowchart illustrating the execution of operation, according to an example embodiment, that matches a portion of the image for editing, and the image identified from the quick search result array.

FIG. 21 is a flowchart illustrating the example execution of operation 2004. Shown is an operation 2101 that, when executed, compares bit values of the portion of the image for editing, and the image identified from the quick search result array. An operation 2102 is executed that applies a probability algorithm to identify a portion of the image identified from the quick search result array as being the same as the portion of the image identified for editing. In one example embodiment, a portion of an image for editing (see e.g., 702) may be used as the basis for determining a similarity (e.g., a common characteristics having a high probability) with the image identified from the quick search result array. In one example embodiment, color codes values are used, and were color codes have a high probability of being the same an identified portion of the quick search result array is retrieved. This probability algorithm may be based upon the use of some type of Artificial Intelligence (AI) algorithm. An operation 2103 is executed that retrieves the identified portion of the quick search result array to be used to augment the image 502 (see e.g., augmented image 901 in FIG. 9).

In some example embodiments, the operation 2101 may implement any number of deterministic AI algorithms as a probability algorithm. These deterministic AI algorithms may utilize Case-Based Reasoning, Bayesian networks (including Hidden Markov Models), Neural Networks, or Fuzzy Systems. The Bayesian networks may include: Machine Learning Algorithms including-Supervised Learning, Unsupervised Learning, Semi-Supervised Learning, Reinforcement Learning, Transduction, Learning to Learn Algorithms, or some other suitable Bayesian network. The Neural Networks may include: Kohonen Self-Organizing Network, Recurrent Networks, Simple Recurrent Networks, Hopfield Networks, Stochastic Neural Networks, Boltzmann Machines, Modular Neural Networks, Committee of Machines, Associative Neural Network (ASNN), Holographic Associative Memory, Instantaneously Trained Networks, Spiking Neural Networks, Dynamic Neural Networks, Cascading Neural Networks, Neuro-Fuzzy Networks, or some other suitable Neural Network. In some example embodiments, the operation 2102 may use some type of advanced statistical method or algorithm. These methods may include the use of Statistical Clusters, K-Means, Random Forests, Markov Processes, or some other suitable statistical method, or algorithm.

In some example embodiments, a deterministic AI algorithm is trained using characteristics of a first image. Once trained, the AI algorithm is provided portions of a second image. The AI algorithm determines whether the second image has a high probability of having the characteristic of the first image.

Figure 22:
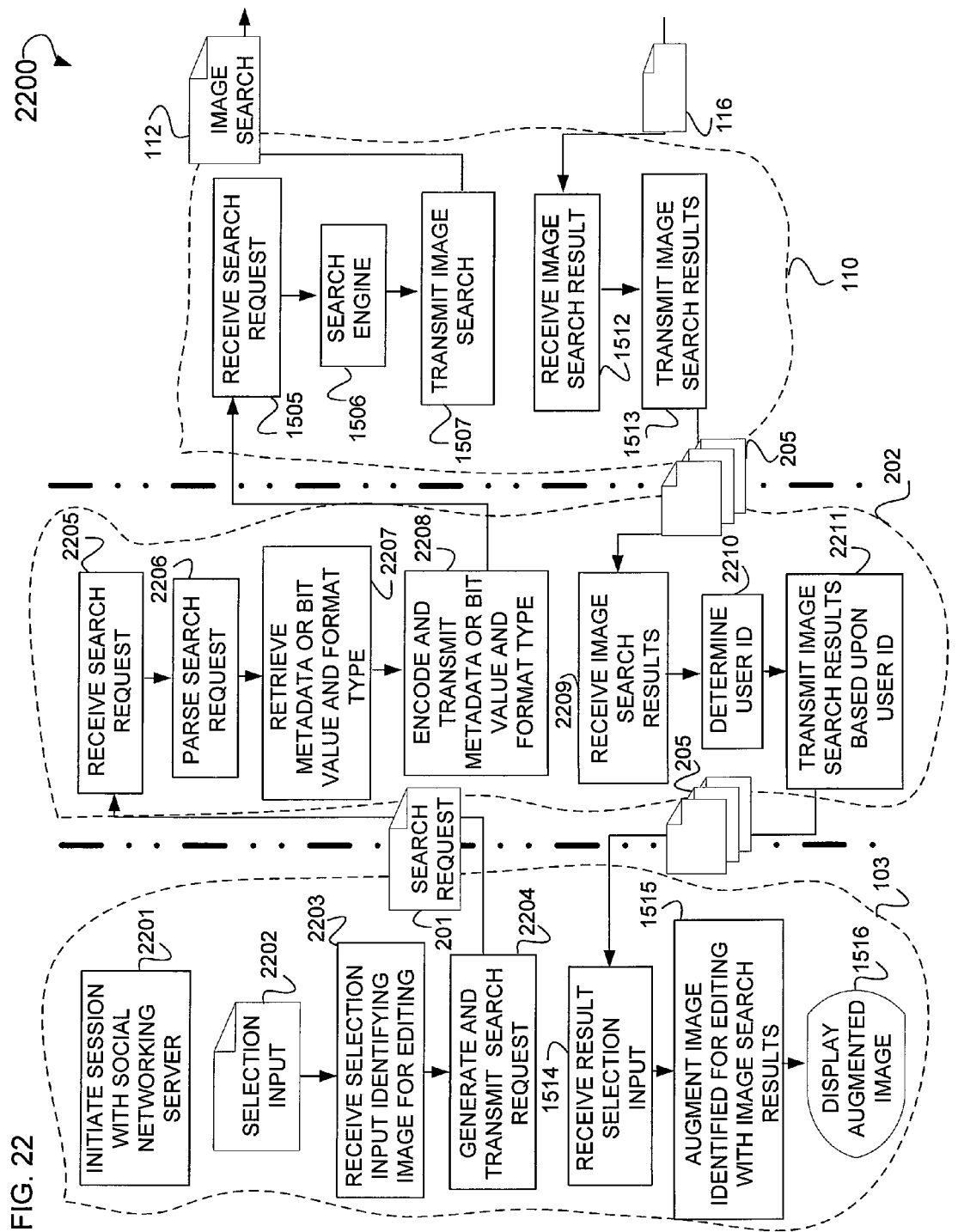
FIG. 22 is a tri-stream flowchart illustrating a method, according to an example embodiment, to generate an augmented image for use within a social network.

FIG. 22 is a tri-stream flowchart illustrating the generation of an augmented image within a social networking context. Shown is an operation 2201, 2203, 2204 and a selection input 2202 that may be generated or otherwise reside upon the one or more devices 103. Also shown are operations 2205-2211 that may reside upon or otherwise be executed by the social networking server 202.

In one example embodiment, an operation 2201 is executed to initiate a session with the social networking server. This session may be a TCP/IP session, a login session, or some other suitable session. This session exists between the one or more devices 103 and the social networking server 202. Selection input 2202 is generated using some type of input device. An operation 2203 is executed that receives the selection input 2202 identifying image for editing. An operation 2204 is executed that generates and transmits search request 201. An operation 2205 is executed that receives the search request 201. An operation 2206 is executed that parses the search request to obtain information identifying the image or portion thereof to serve as the basis for a search. Additionally, other identifying information including a bit value, metadata, a codec or formatting information may also be obtained via the search request 201. Operation 2207 is executed that retrieves metadata, or bit value and format type information from the search request 201. An operation 2208 is executed that encodes and transmits the metadata or bit value and format type. Further illustrated are the previously shown operations 1505-1507 and 1512-1513. An operation 2209 is executed that receives the image search results 205 from the image editing server 110. An operation 2210 is executed that determines a user ID such as the ID of the user 101, or the user 302. This ID may be a network handle that the user 302 may utilize when accessing the social networking server 202. A network handle may be an identifier based upon which a user is known within a social network. An operation 2211 is executed that transmit the image search results 205 based upon the user ID. This image search results 205 are received through the execution of the previous illustrated operation 1514. Further, operation 1515 and 1516 may be executed as previously illustrated.

Example Database

Some embodiments may include the various databases (e.g., 111, 115, and 122) being relational databases, or, in some cases, On Line Analytic Processing (OLAP-) based databases. In the case of relational databases, various tables of data are created and data is inserted into and/or selected from these tables using SQL, or some other database-query language known in the art. In the case of OLAP databases, one or more multi-dimensional cubes or hyper cubes, including multidimensional data from which data is selected from or inserted into using a Multidimensional Expression (MDX) language, may be implemented. In the case of a database using tables and SQL, a database application such as, for example, MYSQL™, MICROSOFT SQL SERVER™, ORACLE 81™, 10G™, or some other suitable database application may be used to manage the data. In this, the case of a database using cubes and MDX, a database using Multidimensional On Line Analytic Processing (MOLAP), Relational On Line Analytic Processing (ROLAP), Hybrid Online Analytic Processing (HOLAP), or some other suitable database application may be used to manage the data. The tables or cubes made up of tables, in the case of, for example, ROLAP, are organized into an RDS or Object Relational Data Schema (ORDS), as is known in the art. These schemas may be normalized using certain normalization algorithms so as to avoid abnormalities such as non-additive joins and other problems. Additionally, these normalization algorithms may include Boyce-Codd Normal Form or some other normalization, or optimization algorithm known in the art.

Figure 23:
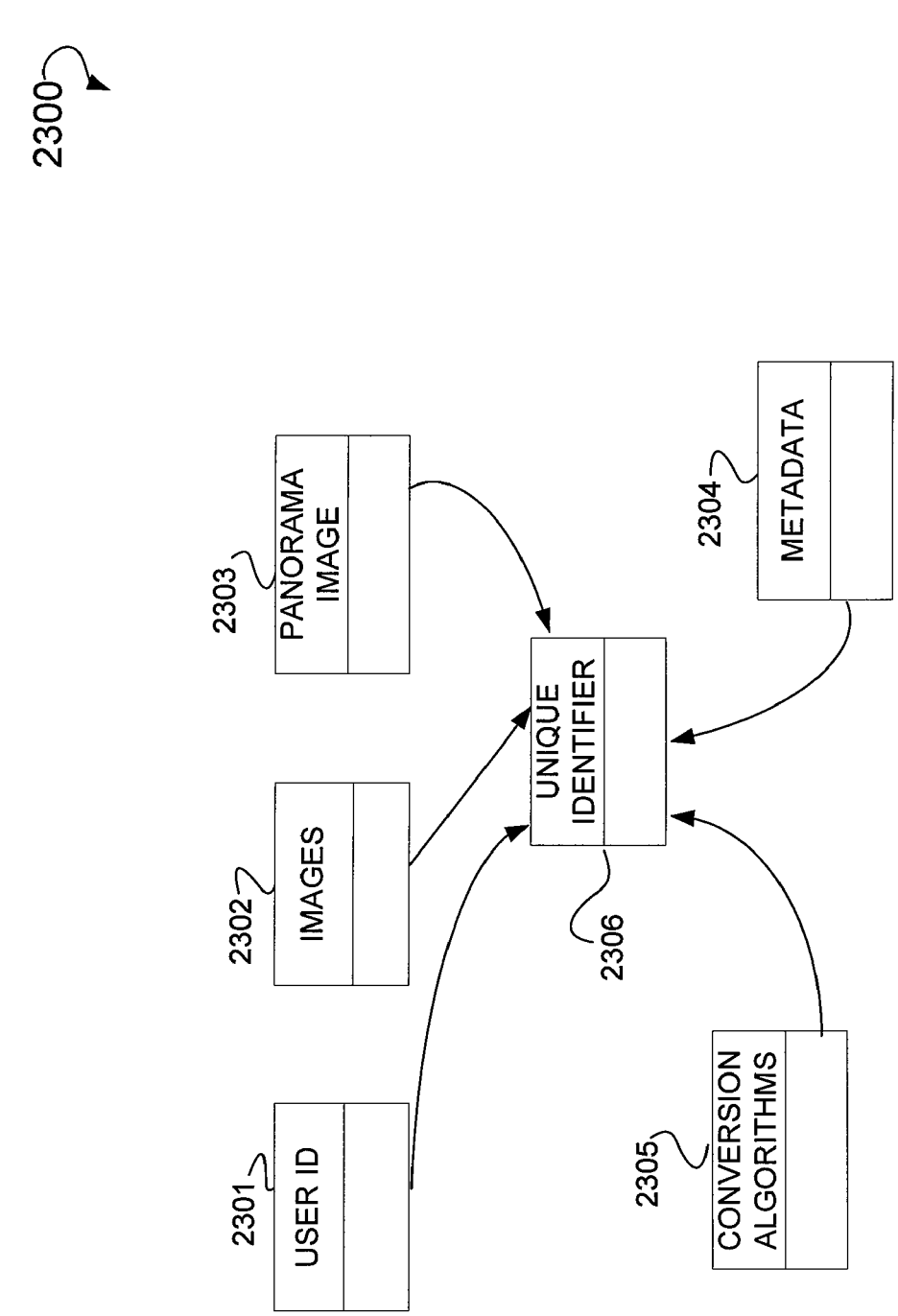
FIG. 23 is a Relational Data Schema (RDS), according to an example embodiment.

FIG. 23 is a RDS 2300. Shown is a table 2301 that includes user IDs. These user IDs may be Globally Unique Identifiers (GUID) values in the form of strings, integers, or some other suitable uniquely identifying value. A table 2302 is shown that includes images. These images may be stored as a Binary Large Object (BLOB) data type. Also includes in this table 2302 may be formatting information in the form of codec information stored as a string data type. A table 2303 is shown that includes panorama image data. This panorama image data may be stored as a BLOB. Also shown is a table 2304 that includes metadata. This metadata may be stored as, for example, an XML data type, HTML data type, or some other suitable data type. A table 2302 is shown that includes conversion algorithms. These conversion algorithms may be stored as a BLOB, or an XML data type. A table 2306 is shown that includes unique identifier information to uniquely identify each of the entries (e.g., tuples) in each of the tables 2301-2305.

Component Design

Some example embodiments may include the above-illustrated operations being written as one or more software components. These components, and the functionality associated with each, may be used by client, server, or peer computer systems. These various components can be implemented into the system on an as-needed basis. These components may be written in an object-oriented computer language such that a component oriented or object-oriented programming technique can be implemented using a Visual Component Library (VCL), Component Library for Cross Platform (CLX), Java Beans (JB), Enterprise Java Beans (EJB), Component Object Model (COM), or Distributed Component Object Model (DCOM)), or other suitable technique. These components are linked to other components via various Application Programming Interfaces (APIs) and then compiled into one complete server and/or client application. The method for using components in the building of client and server applications is well known in the art. Further, these components may be linked together via various distributed programming protocols as distributed computing components.

Distributed Computing Components and Protocols

Some example embodiments may include remote procedure calls being used to implement one or more of the above-illustrated components across a distributed programming environment. For example, a logic level may reside on a first computer system that is located remotely from a second computer system including an interface level (e.g., a GUI). These first and second computer systems can be configured in a server-client, peer-to-peer, or some other configuration. The various levels can be written using the above-illustrated component design principles and can be written in the same programming language or in different programming languages. Various protocols may be implemented to enable these various levels and the components included therein to communicate regardless of the programming language used to write these components. For example, an operation written in C++ using Common Object Request Broker Architecture (CORBA) or Simple Object Access Protocol (SOAP) can communicate with another remote module written in Java™. Suitable protocols include SOAP, CORBA, and other protocols well-known in the art.

A System of Transmission Between a Server and Client

Some embodiments may utilize the OSI model or TCP/IP protocol stack model for defining the protocols used by a network to transmit data. In applying these models, a system of data transmission between a server and client, or between peer computer systems, is illustrated as a series of roughly five layers comprising: an application layer, a transport layer, a network layer, a data link layer, and a physical layer. In the case of software having a three-tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also includes port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an internet, LAN, WAN, or some other suitable network. In some cases, internet refers to a network of networks. These networks may use a variety of protocols for the exchange of data, including the aforementioned TCP/IP, or some other suitable protocol. These networks may be organized within a variety of topologies (e.g., a star topology) or structures.

A Computer System

Figure 24:
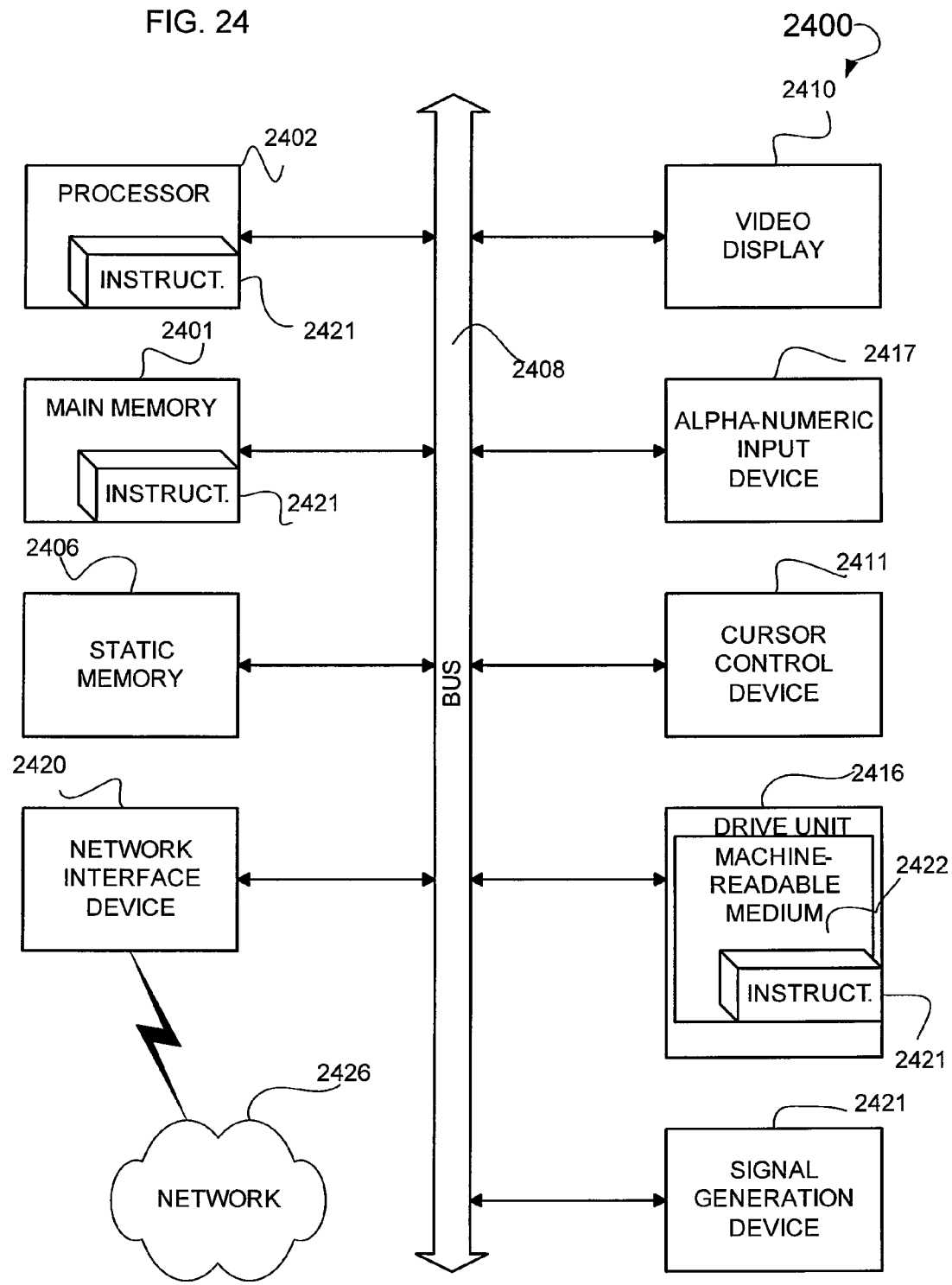
FIG. 24 shows a diagrammatic representation of a machine in the example form of a computer system that executes a set of instructions to perform any one or more of the methodologies discussed herein.

FIG. 24 shows a diagrammatic representation of a machine in the example form of a computer system 2400 that executes a set of instructions to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment or as a peer machine in a peer-to-peer (or distributed) network environment. The machine may be a PC, a tablet PC, a Set-Top Box (STB), a PDA, a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems, which are linked (e.g., either by hardwired, wireless, or a combination of hardwired and wireless connections) through a network, both perform tasks such as those illustrated in the above description.

The example computer system 2400 includes a processor 2402 (e.g., a CPU, a Graphics Processing Unit (GPU) or both), a main memory 2401, and a static memory 2406, which communicate with each other via a bus 2408. The computer system 2400 may further include a video display unit 2410 (e.g., a Liquid Crystal Display (LCD) or a Cathode Ray Tube (CRT)). The computer system 2400 also includes an alphanumeric input device 2417 (e.g., a keyboard), a UI cursor controller 2411 (e.g., a mouse), a drive unit 2416, a signal generation device 2421 (e.g., a speaker) and a network interface device (e.g., a transmitter) 2420. The disk drive unit 2416 includes a machine-readable medium 2422 on which is stored one or more sets of instructions and data structures (e.g., software) 2421 embodying or used by any one or more of the methodologies or functions illustrated herein. The software instructions 2421 may also reside, completely or at least partially, within the main memory 2401 and/or within the processor 2402 during execution thereof by the computer system 2400, the main memory 2401 and the processor 2402 also constituting machine-readable media. The instructions 2421 may further be transmitted or received over a network 2426 via the network interface device 2420 using any one of a number of well-known transfer protocols (e.g., HTTP, or Secure Hyper Text Transfer Protocol (HTTPS)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies illustrated herein. The term "machine-readable medium" shall accordingly be taken to include, but not be limited to, solid-state memories, optical and magnetic media, and carrier wave signals.

Marketplace Applications

In some example embodiments, a system and method is illustrated for augmenting an image with an additional image. This additional image may be retrieved from a database or searchable network and may be retrieved based upon a match between the additional image and the image. The matching may be based upon commonality of bit values, and the color associated with the bit values. The augmenting of the image may be performed using some type of client engine associated with a browser application. An augmented image may be displayed as part of a web page served up by a social networking server.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer implemented method comprising:
   receiving a selection of at least a portion of a first image, the selection including image data identifying a characteristic of the portion of the first image for use in searching an image database, the first image displayed as part of a Graphical User Interface (GUI);
   defining an area associated with the first image into which at least a portion of a second image may be inserted to augment the first image, the defined area being distinct from and adjacent to the portion of the first image selected for use in searching the image database;
   generating, using a processor of a machine, a search request for the second image containing the characteristic, the search request to trigger a search of the image database for the second image containing the characteristic;
   receiving an image search result including at least the second image, the second image displayed as part of an image array within the GUI; and
   augmenting the first image by inserting at least a portion of the second image into the defined area that is distinct from and adjacent to the portion of the first image selected for use in searching the image database, based upon the characteristic, to create an augmented image, the augmenting including aligning at least the portion of the second image with the first image based upon one or more common values.

2. The computer implemented method of claim 1, further comprising displaying the augmented image within the GUI.

3. The computer implemented method of claim 1, further comprising selecting the second image from the image array using an input device.

4. The computer implemented method of claim 1, further comprising selecting the second image from the image array using a probability algorithm.

5. The computer implemented method of claim 1, wherein the characteristic is formatted in a format including at least one of a bit value format, a file format description, or a metadata format.

6. The computer implemented method of claim 1, wherein the characteristic includes at least one of a color histogram, an image pattern, a bit value and associated codec, or macroblock matching.

7. A computer implemented method comprising:
   receiving a search request including image data identifying a characteristic of a portion of a first image selected to serve as a basis for searching an image database;
   conducting a search in the image database of images for a second image containing the characteristic for use in augmenting the first image within a defined area associated with the first image that is distinct from and adjacent to the portion of the first image selected to serve as the basis for searching the image database, the conducting of the search including using a probability algorithm to determine an existence of the characteristic in the second image; and
   transmitting an image search result that includes the second image, the second image to augment the first image within the defined area associated with the first image that is distinct from and adjacent to the portion of the first image selected to serve as the basis for searching the image database by aligning at least a portion of the second image with the first image based upon one or more common values.

8. The computer implemented method of claim 5, wherein the search includes a search of at least one of a network, or of a database.

9. A computer system comprising:
   a processor of a machine;
   a first receiver to receive a selection of at least a portion of a first image, the selection including image data that identifies a characteristic of the portion of the first image for use in searching an image database, the first image displayed as part of a Graphical User Interface (GUI);
   a second receiver to receive an indication defining an area associated with the first image into which at least a portion of a second image may be inserted to augment the first image, the defined area being distinct from and adjacent to the portion of the first image selected for use in searching the image database;
   a search request generator to generate, using the processor, a search request for the second image containing the characteristic, the search request to trigger a search of the image database for the second image containing the characteristic;

a third receiver to receive an image search result that includes at least the second image, the second image displayed as part of an image array within the GUI; and an augmentation engine to augment the first image by inserting at least a portion of the second image into the defined area that is distinct from and adjacent to the portion of the first image selected for use in searching the image database, based upon the characteristic, to create an augmented image, the augmented image being created by aligning at least the portion of the second image with the first image based upon one or more common values.

10. The computer system of claim 9, further comprising a display to display the augmented image within the GUI.

11. The computer system of claim 9, further comprising an input device to select an area of the first image to be augmented.

12. The computer system of claim 9, further comprising an input device to select the second image from the image array.

13. The computer system of claim 9, further comprising a selection engine to select the second image from the image array through the use of a probability algorithm.

14. The computer system of claim 9, wherein the characteristic is formatted in a format that includes at least one of a bit value format, a file format description, or a metadata format.

15. The computer system of claim 9, wherein the characteristic includes at least one of a color histogram, an image pattern, a bit value and associated codec, or macro-block matching.

16. A computer system comprising:
a receiver to receive a search request that includes image data that identifies a characteristic of a portion of a first image selected to serve as a basis for searching an image database;
a search engine to conduct a search in the image database of images for a second image containing the characteristic for use in augmenting the first image within a defined area associated with the first image that is distinct from and adjacent to the portion of the first image selected to serve as the basis for searching the image database, the search comprising applying a probability algorithm to determine an existence of the characteristic in the second image; and
a transmitter to transmit an image search result that includes the second image, the second image to augment the first image within the defined area associated with the first image that is distinct from and adjacent to the portion of the first image selected to serve as the basis for searching the image database by aligning at least a portion of the second image with the first image based upon one or more common values.

17. The computer system of claim 16, wherein the search includes a search of at least one of a network, or of a database.

18. A computer system comprising:
a processor of a machine;
means for receiving a selection of at least a portion of a first image, the selection including image data identifying a characteristic of the portion of the first image for use in searching an image database, the first image displayed as part of a Graphical User Interface (GUI);
means for defining an area associated with the first image into which at least a portion of a second image may be inserted to augment the first image, the defined area being distinct from and adjacent to the portion of the first image selected for use in searching the image database;
means for generating, using the processor, a search request for the second image containing the characteristic, the search request to trigger a search of the image database for the second image containing the characteristic;
means for receiving an image search result including at least the second image, the second image displayed as part of an image array within the GUI; and
means for augmenting the first image by inserting at least the portion of the second image into the define area that is distinct from and adjacent to the portion of the first image selected for use in searching the image database, based upon the characteristic, to create an augmented image by aligning at least the portion of the second image with the first image based upon one or more common values.

19. A non-transitory machine-readable medium comprising instructions, which when implemented by one or more processors, cause the one or more machines to perform operations comprising:
receiving a selection of at least a portion of a first image, the selection including image data identifying a characteristic of the portion of the first image for use in searching an image database, the first image displayed as part of a Graphical User Interface (GUI);
defining an area associated with the first image into which at least a portion of a second image may be inserted to augment the first image, the defined area being distinct from and adjacent to the portion of the first image selected for use in searching the image database;
generating a search request for the second image containing the characteristic, the search request to trigger a search of the image database for the second image containing the characteristic;
receiving an image search result including at least the second image, the second image displayed as part of an image array within the GUI; and
augmenting the first image by inserting at least the portion of the second image into the defined area that is distinct from and adjacent to the portion of the first image selected for use in searching the image database, based upon the characteristic, to create an augmented image, the augmenting including aligning at least the portion of the second image with the first image based upon one or more common values.

20. The computer implemented method of claim 7, wherein the probability algorithm comprises a deterministic artificial intelligence algorithm.

21. The computer implemented method of claim 1, wherein the augmenting comprises replacing a portion of the first image with a portion of the second image.

22. The computer implemented method of claim 1, further comprising defining an area into which the portion of the second image is to be inserted to augment the first image.

23. The computer implemented method of claim 7, further comprising:
training the probability algorithm using characteristics of the first image; and
determining whether the second image has a high probability of having the characteristic of the first image.

* * * * *